United States Patent [19]
Liew

[11] Patent Number: 5,327,552
[45] Date of Patent: Jul. 5, 1994

[54] METHOD AND SYSTEM FOR CORRECTING ROUTING ERRORS DUE TO PACKET DEFLECTIONS

[75] Inventor: Soung C. Liew, Somerset, N.J.

[73] Assignee: Bell Communications Research, Inc., Livingston, N.J.

[21] Appl. No.: 902,010

[22] Filed: Jun. 22, 1992

[51] Int. Cl.$^5$ .................... H04J 13/00; H04Q 11/04
[52] U.S. Cl. ..................... 395/575; 370/160
[58] Field of Search .............. 395/575; 370/60, 60.1, 370/16.0

[56] References Cited

U.S. PATENT DOCUMENTS

| | | | |
|---|---|---|---|
| 4,679,190 | 7/1987 | Dias et al. | 370/60 |
| 4,901,309 | 2/1990 | Turner | 370/60 |
| 5,072,440 | 12/1991 | Isono et al. | 370/60 |
| 5,131,041 | 7/1992 | Brunner et al. | 370/58.2 |

OTHER PUBLICATIONS

A. Krishna & B. Hajek, "Performance of Shuffle-Like Switching Networks with Deflection", IEEE INFOCOM 1990, San Francisco, Calif. pp. 473–480.

M. Decina, P. Giacommazi & A. Pattavine "Shuffle Intercorrection Networks with Deflection Routing for ATM Switching: the Open-Loop Shuffleout", INFOCOM Sep. 1991, University La Sapeinza, Rome, Italy, pp. 27–34.

Kumar et al, "Phoenix: A Building Block for Fault Tolerant Broadband Packet Switches" 1991 IEEE Globecom 1991 pp. 228–233.

Maxemchuk "Comparison of Deflection on Store and Forward Techniques in the Manhatten Street and Shuffle-Exchange Networks" 1989 IEEE pp. 800–809.

Uematsu et al, "Architecture of a Packett Switch Based on Banyan Switching Network with Feedback Loops" IEEE Journal of Selected areas of Comm. 1988 Dec. pp. 1521–1527.

Tan et al, "Optimal Routing in the Shuffle-Exchange Networks for Multiprocessor System" 1988 IEEE pp. 255–264.

Primary Examiner—Robert W. Beausoliel, Jr.
Assistant Examiner—Joseph E. Palys
Attorney, Agent, or Firm—Leonard Charles Suchyta; Stephen M. Gurey

[57] ABSTRACT

A distributed and adaptive method and system are provided for correcting routing errors due to packet deflections in a dual-shuffle exchange network (DSN). The DSN includes a shuffle-exchange network (SN) and an unshuffle-exchange network (USN). A packet that cannot be routed correctly will be temporarily "deflected" to a wrong route. This deflection, or routing error, is then registered and encoded in a routing tag of the header of the packet. Using this information, an error-correcting routing algorithm is then used to correct the error at a different part of the network. The method and system can be used either as the basis of a switch architecture of a ultra high-speed local-area network or metropolitan area network. Also, the method and system can be used in circuit switching. The DSN can achieve the Shannon's lower bound N log N on switch complexity with arbitrarily small packet-loss probability.

14 Claims, 11 Drawing Sheets

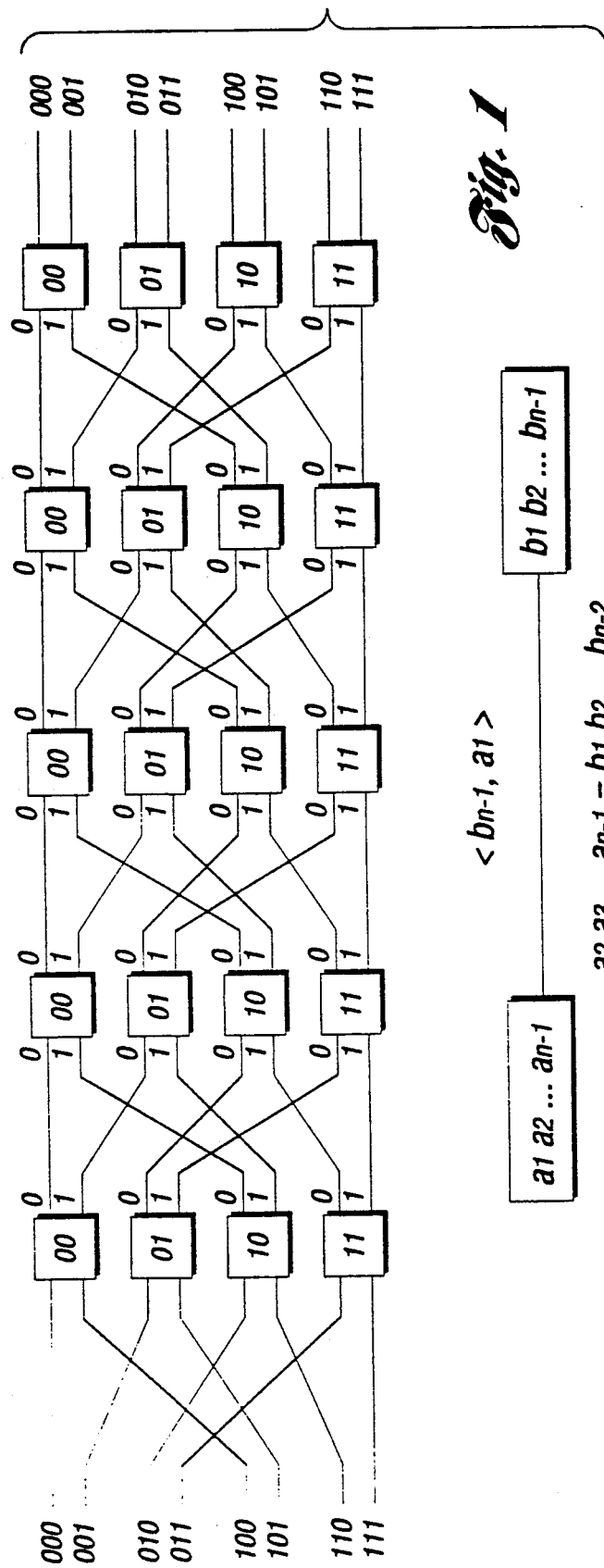
Fig. 1
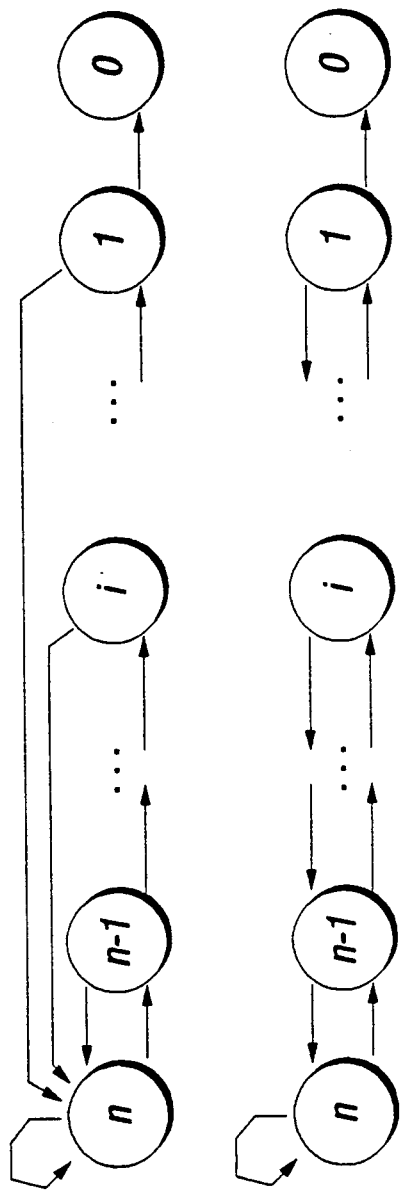
Fig. 2a
Fig. 2b

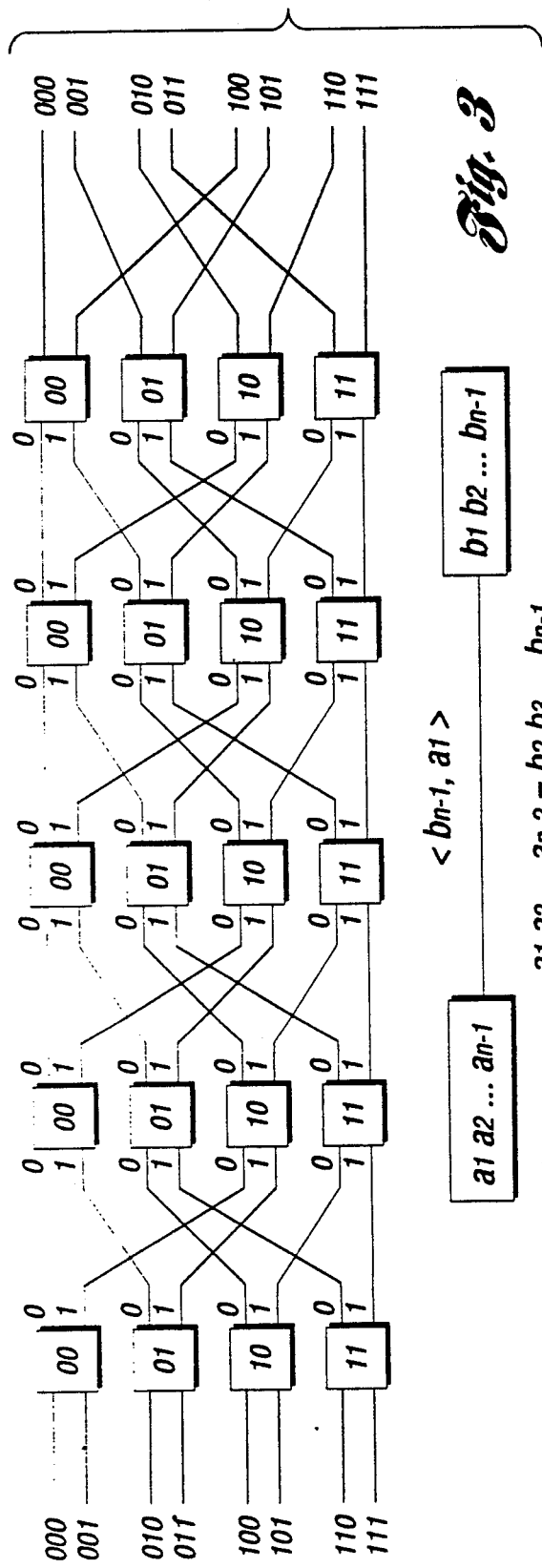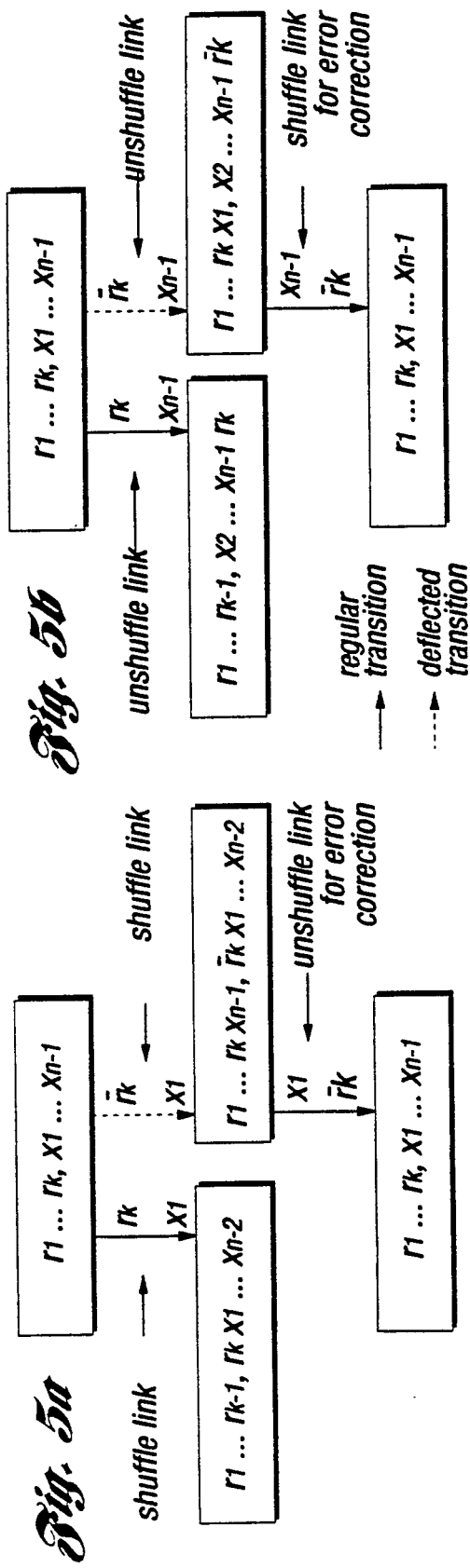

State transition of packets A and B
          error        error correction

A: 010 → (111011, 10) → (1110, 01) → (111000, 11) → (1110, 01) → (11, 10) → 101

B: 100 → (101011, 10) → (1010, 01) → (10, 10) → 100

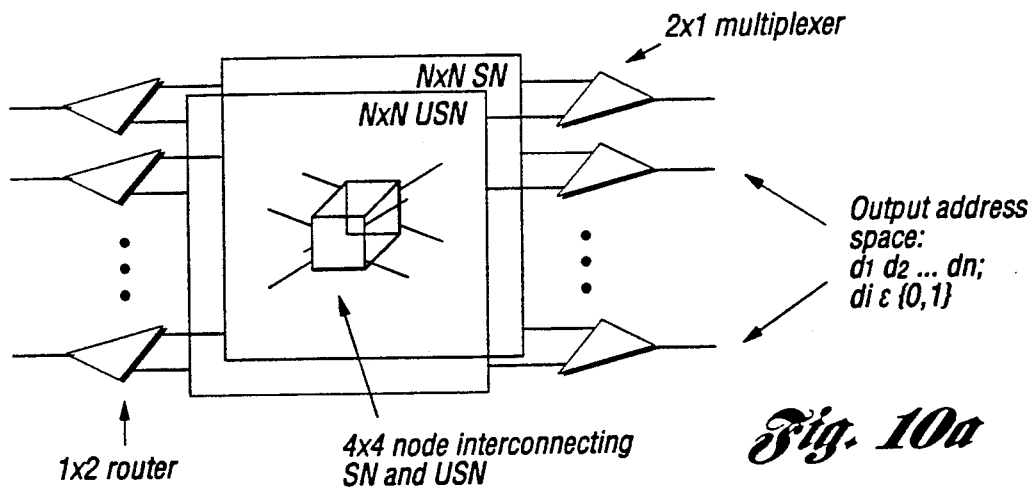
Fig. 10a
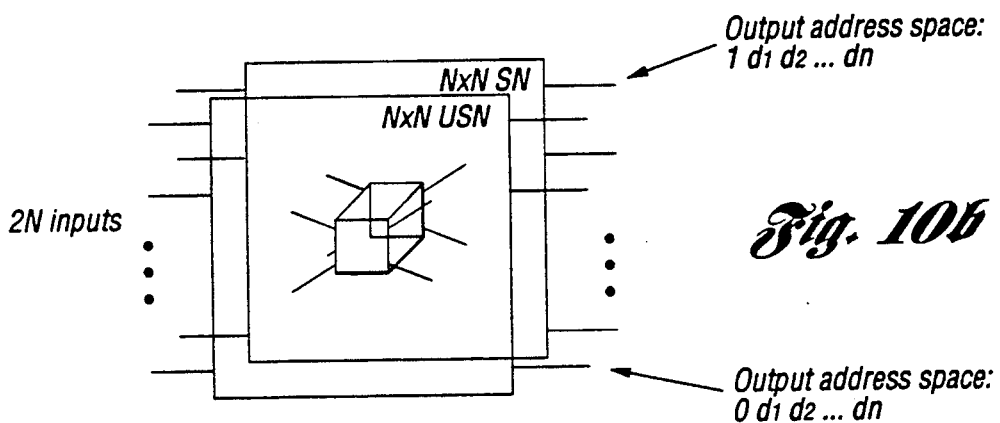
Fig. 10b
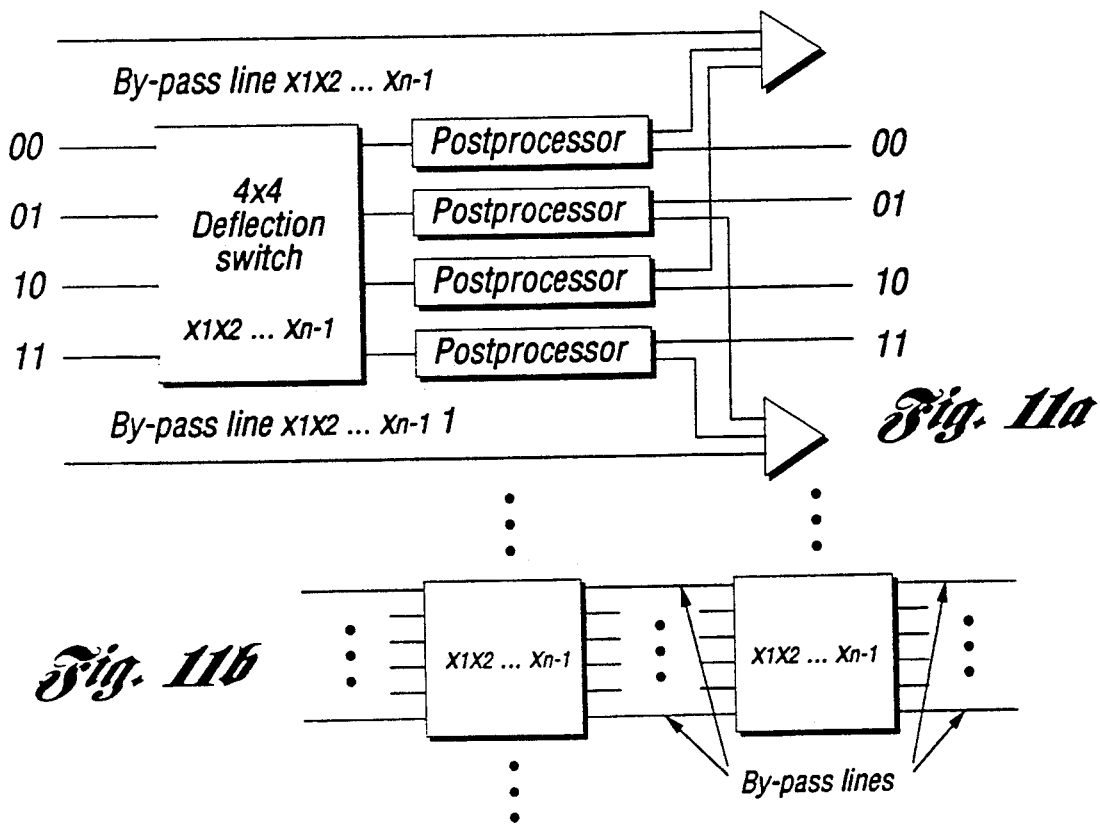
Fig. 11a
Fig. 11b

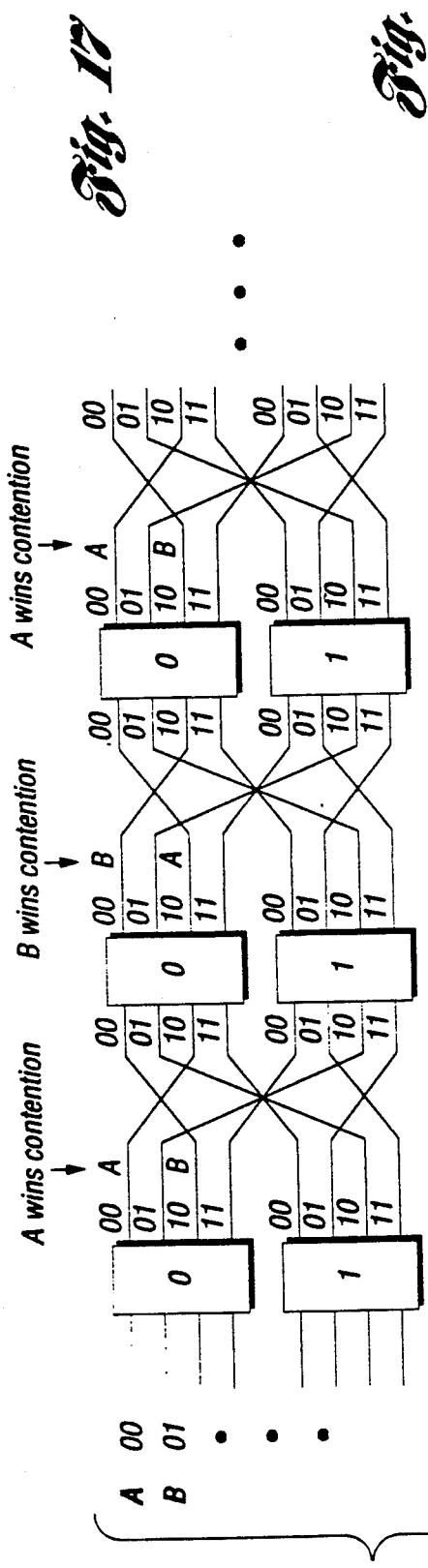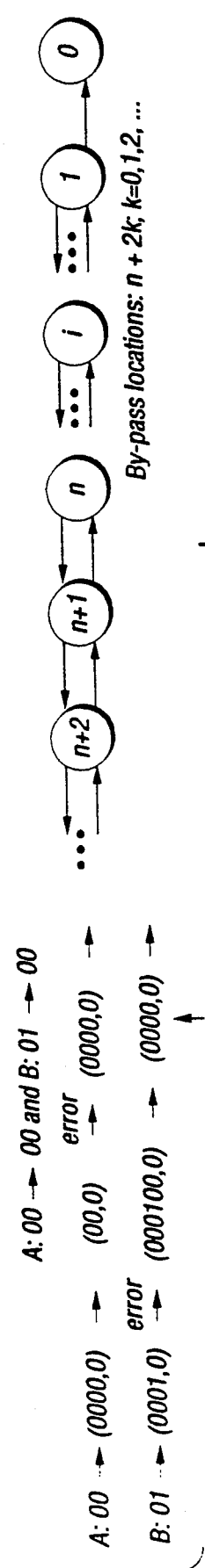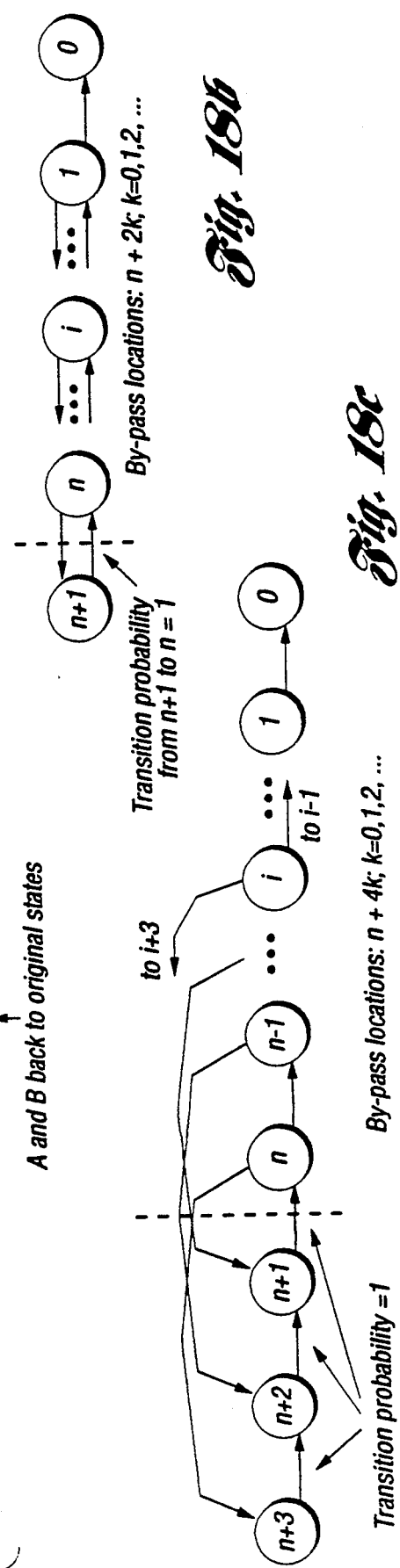

METHOD AND SYSTEM FOR CORRECTING ROUTING ERRORS DUE TO PACKET DEFLECTIONS

TECHNICAL FIELD

This invention relates to methods and systems for correcting routing errors due to packet deflections and, in particular, to methods and systems for correcting routing errors due to packet deflections using a dual-shuffle exchange network.

BACKGROUND ART

In packet switching, the messages to be switched are divided into information blocks called packets. In a self-routing switch having N inputs and N outputs, the output address of an input packet is embedded in the header of the packet. Typically, the switch consists of an interconnection of switch nodes. Based on the header information, the switch nodes execute a self-routing algorithm in a distributed manner without any external intervention. In such a system, packets may contend for the same internal link or same output port, resulting in packet conflicts.

Various switch architectures have been proposed during the last decade, most notably, the input-queued Batcher-banyan switch and the output-queued Knockout switch. The Batcher-banyan switch aims at eliminating packet contention completely. Basically, only a subset of input packets which have non-conflicting output destinations is switched at any given time slot or switch cycle. Consequently, the packets that have been denied output access must be buffered or queued at the inputs. The throughput of the Batcher-banyan switch is limited by the so-called head-of-line blocking; the packet losing contention at the head of the input queue may block all the subsequent packets, even though they may be destined for some idle outputs. In addition, the complexity of the switch is of order $N(\log N)^2$, which is above the lower bound of $N \log N$ switch complexity established by Shannon. The performance, however, is perfect in the sense that packets are never routed to the wrong destinations and are never dropped due to contention.

The knockout switch allows packets from several inputs to reach the same output simultaneously, In this way, it is less likely for a packet to lose contention. Indeed, to the extent that this likelihood is sufficiently small, one can simply drop packets in excess of the available paths. This introduces a non-zero packet-loss probability, which, however, can be made arbitrarily small by increasing the number of paths from each input to each output. The complexity of the knockout switch is of order $N^2$. A dilated-banyan network, which has the same design philosophy as the knockout switch, is of complexity order $N \log N (\log \log N)$.

An alternative switch-design approach is to employ deflection routing in the system. As a reference, both the tandem-banyan network and the shuffle-exchange network are based on deflection routing. In these systems, a packet that has lost contention in a switch node inside the overall switch is simply deflected to a wrong route temporarily. Redundancy is introduced in the routing process and the switch design so that the deflected packet can be routed in the later switching stages in a way that compensates for the earlier mistake. The key issue in designing such a system is to minimize the redundancy introduced by packet deflection. The concept of error-correcting routing in switching requires the right switch topology to achieve the $N \log N$ bound. Any arbitrary switch design is not likely to achieve the goal. For instance, the tandem-banyan network and the shuffle-exchange network are both of order $N(\log N)^2$.

SUMMARY OF THE INVENTION

An object of the present invention is to provide a method and system for correcting routing errors due to packet deflections wherein a routing algorithm performed on a dual-shuffle exchange network (DSN) minimizes the cost of deflection errors and wherein the complexity of the switching network is of order $N \log N$, with arbitrarily small loss probability and close-to-100% throughput.

In carrying out the above object and other objects, features and advantages of the invention, disclosed is a method for correcting a routing error caused by deflection of a packet having a routing tag in a dual-shuffle exchange network (DSN) having routing stages. The method includes the steps of modifying the routing tag of the packet when the deflection occurs at a first routing stage of the DSN so that the routing tag includes error correcting information, and utilizing the error correcting information at a second routing stage of the DSN to correct the routing error in the DSN.

A system is also disclosed for carrying out the method steps.

The method and system are also useful for use in a communication network.

Also, the method and system are useful in circuit switching.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic view of an 8×8 shuffle-exchange network;

FIG. 2a is a state-transition diagram of a packet in the shuffle-exchange network, where the distance from destination is the state;

FIG. 2b is a view illustrating a one-step penalty state transition;

FIG. 3 is a schematic view of an 8×8 unshuffle-exchange network;

FIGS. 5a and 5b are state diagrams of the error-correcting procedure; FIG. 5a illustrating routing in SN; and FIG. 5b illustrating routing in USN;

FIGS. 10a and 10b are views illustrating a DSN configured as N×N switch and a DSN configured as 2N×2N switch, respectively;

FIG. 11a is a block diagram of a switch node and FIG. 11b is a view illustrating the interconnection of by-pass lines between adjacent switch nodes of same label;

FIG. 17 is a view illustrating a possible deadlock situation in a 4×4 DSN involving two packets;

FIGS. 18a, 18b and 18c are views illustrating several random-walk models realizable with DSN: FIG. 18a: random walk without boundary; FIG. 18b: boundary with one-step reflection to the right; and FIG. 18c: 3-step penalty transition.

BEST MODE FOR CARRYING OUT THE INVENTION

Figure 4:
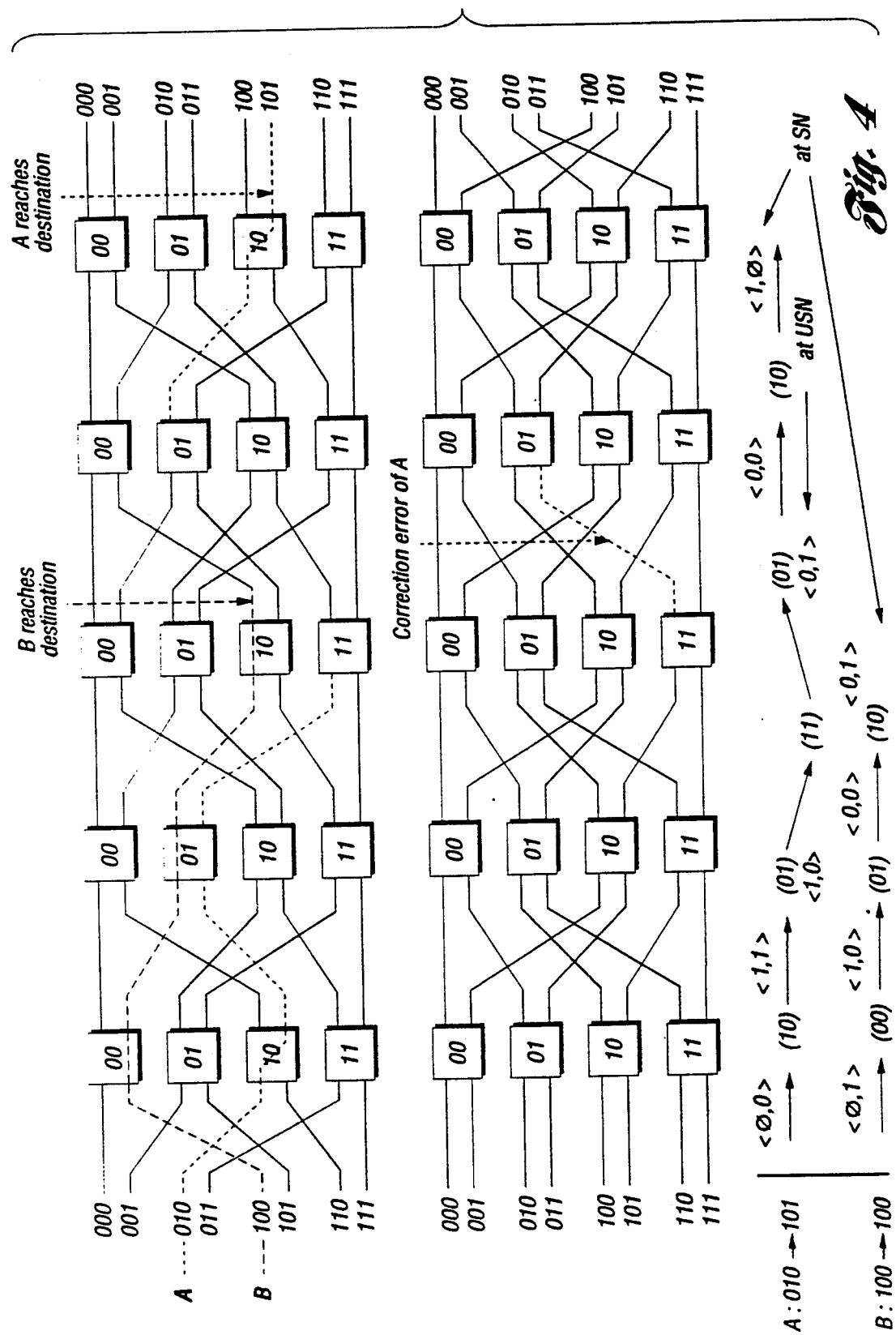
FIG. 4 is a schematic view illustrating an example of deflection error in SN being corrected in USN.

Briefly, the method and system of the present invention are utilized in a dual shuffle exchange network which consists of a shuffle-exchange network overlaid with a unshuffle-exchange network as illustrated in FIGS. 1 and 3, respectively. These networks are the mirror images or duals of each other. Routing errors in either of these networks working as an isolated unit cannot be corrected easily. Typically, multiple additional routing stages are needed to compensate for each error. With a dual shuffle-exchange network, on the other hand, the deflection in one network can be corrected in a single step in the companion network, and this is the reason for two networks complementing each other to work as a single unit.

This kind of arrangement also means that the algorithm of the present invention must have a mechanism for transferring of packets between the two networks in a dynamic fashion. This is achieved by attaching additional error-correcting bits in the routing tag (which originally consists only of the destination address) of the packet header whenever deflecting occurs.

This specification is organized as follows. The first section describes the routing mechanism in the shuffle-exchange network with deflection routing. Its deficiencies are pointed out. The next section provides the fundamentals of error-correcting routing based on the dual shuffle-exchange network. The basic self-routing algorithm is described in detail. In addition, various implementation issues are addressed. The N log N bound is shown analytically to be achievable with the dual shuffle-exchange network in the following section. The analysis and the correctness of the algorithm are also verified by simulation. The next section deals with various miscellaneous system issues that deserve further attention and provides preliminary research results in these directions. Finally, the main results and implications of this work are summarized in the last section.

Shuffle-Exchange Network with Deflection Routing

A shuffle-exchange network (SN) with $N=2^n$ inputs and outputs, and $L \geq n$ stages, each consisting of N/2 2×2 switch elements is illustrated in FIG. 1 as an 8×8 SN with 5 stages. To explain the self-routing mechanism of the SN, it is assumed that L=n; i.e. the SN of FIG. 1 has only 3 stages. The switch nodes in each stage are labeled by an (n−1)-bit binary number from top to bottom. The upper input (output) of each node is labeled by 0, and the lower input (output) is labeled by 1. A packet will be forwarded to output 0 (1) at stage i if the ith most significant bit of its destination address is 0(1). Two consecutive stages are connected by shuffle interconnection; node $A=(a_1a_2 \ldots a_{n-1})$ is connected to node $B=(b_1b_2 \ldots b_{n-1})$ of the subsequent stage if $a_2a_3 \ldots a_{n-1}=b_1b_2 \ldots b_{n-2}$. The link between node A and node B is labeled $<b_{n-1},a_1>$, where $b_{n-1}$ is the output label of node A and $a_1$ is the input label of node B. The path of a packet from input to output is completely determined by the source address $S=s_1 \ldots s_n$ and the destination address $D=d_1 \ldots d_n$. This path can be expressed symbolically by using the above numbering scheme as follows:

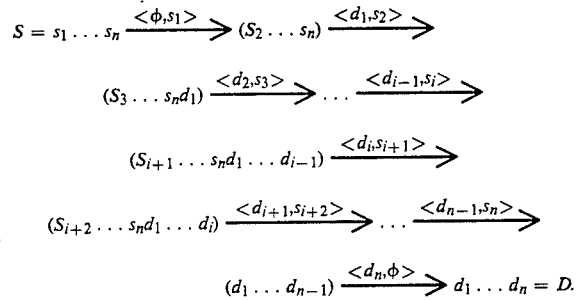

The above sequence of nodes is actually embedded in the binary string $s_2 \ldots s_nd_1 \ldots d_{n-1}$ and can be revealed by an (n−1)-bit window moving one bit per stage from left to right.

The state of a packet traveling in the SN can be represented by a two-tuple (R,X), where R is the routing tag in the header of the packet and X is the label of the node that the packet resides. At the first stage, the packet is in stage $(d_n \ldots d_1, s_2 \ldots s_n)$. The state transition is determined by the self-routing algorithm, and can be expressed by:

$$(r_1 \ldots r_k, x_1 \ldots s_{n-1}) \xrightarrow{<r_k, s_1>} (r_1 \ldots r_{k-1}, x_2 \ldots s_{n-1}r_k).$$

At the final stage, the packet will reach the state $(d_n,d_1 \ldots d_{n-1})$, which is independent of the source address. That is, after this stage, a packet will arrive at the desired output regardless where it is coming from.

The above describes what happens when the routes taken by packets do not overlap. Contention occurs in a switch node when two input packets request the same output. One of them will be successfully routed while the other one will be deflected to the wrong output.

Thus, if L=n, only a fraction of the packets can be routed correctly in the end which are easily shown by a calculation and is well known in the art. However, with L>n, an error-correcting routing algorithm can be implemented as follows.

All output links of the same row after stage n will be treated as belonging to the same logical address. Whenever a packet is deflected, its routing tag will be reset to $d_n \ldots d_i \ldots d_1$, and the routing starts anew from the deflection point. With this strategy, some packets will reach their destinations after fewer numbers of stages than others, and a by-pass mechanism is needed to collect and multiplex packets that reach different physical links of the same logical address. The design of the by-pass mechanism is a hardware issue, and is elaborated upon hereinbelow after the fundamentals of the error-correcting algorithm of the present invention have been addressed. A packet eventually reaches its destination address with good probability provided that the number of stages L is sufficiently large. The packet is lost, or dropped, if it can not reach the destination after L stages.

The error-correcting SN, however, is highly inefficient, especially when n is large. This is because each time an error is made, routing of the packet must be restarted from the beginning. This fact is illustrated by the state-transition diagram of FIG. 2A, in which the state is the distance or the number of stages away from destination. It has been argued that the number of stages, L, required for reasonably low packet-loss probability is of order $n^2$, making the overall complexity of the SN of order $N(\log N)^2$, the same as that of the Batcher-banyan network. The key to achieving the minimum NlogN complexity is to find a network and its associated error-correcting routing algorithm that does not penalize deflection as severely as in the SN. A desired network would be one with the state-transition diagram shown in FIG. 2(b), in which the penalty is only one step backward. A network with a one-step error-correcting routing algorithm is disclosed in the next section.

Dual Shuffle-Exchange Network With Error-Correcting Routing

In this section, there is introduced an error-correcting routing algorithm performed on a dual shuffle-exchange network (DSN) to reduce the penalty of deflection discussed in the previous section. The dual shuffle-exchange network consists of a shuffle exchange network (SN) and an unshuffle-exchange network (USN). An 8×8 USN is shown in FIG. 3. As can be seen, it is the mirror image of the SN. Routing bits used in successive stages proceed from the least significant bit to most significant bit rather than the other way around. Using a numbering scheme similar to that in SN, the path of a packet from input to output with source address $S = s_1 \ldots s_n$ and destination address $D = d_1 \ldots d_n$ can be expressed by:

$$S = s_1 \ldots s_n \xrightarrow{<\phi, s_1>} (S_1 \ldots s_{n-1}) \xrightarrow{<d_1, s_{n-1}>}$$

$$(D_n s_1 \ldots s_{n-2}) \xrightarrow{<d_{n-1}, s_{n-2}>} \ldots \xrightarrow{<d_{i+2}, s_{i+1}>}$$

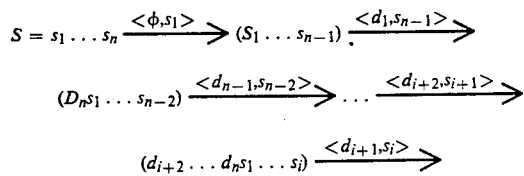

-continued $$(d_{i+1} \ldots d_n s_1 \ldots s_{i-1}) \xrightarrow{<d_i, s_{i-1}>} \ldots \xrightarrow{<d_2, s_1>}$$

$$(d_2 \ldots d_n) \xrightarrow{<d_1, \phi>} d_1 \ldots d_n = D.$$

Similar to the path in a SN, an (n−1)-bit window moves on the binary string $d_2 \ldots d_n s_1 \ldots s_{n-1}$ one bit per stage from right to left reveals the sequence of nodes along the path. The initial state of the packet is $(d_1 \ldots d_n, s_1 \ldots s_{n-1})$, and the state transition is given by:

$$(r_1 \ldots r_k, x_1 \ldots x_{n-1}) \xrightarrow{<r_k, x_{n-1}>} (r_1 \ldots r_{k-1}, r_k x_1 \ldots x_{n-2}).$$

At the last stage, the packet is in state $(d_1, d_2 \ldots d_n)$. Shuffling precedes switching in each stage of the SN, but switching precedes unshuffling in each stage of the USN. Therefore, at the last stage of the USN, the packet would be considered as having reached its destination only after unshuffling of the output links. It is assumed that an USN is overlaid on top of a SN, and each node in the USN is superimposed upon its corresponding node in SN such that a packet in any one of these two companion nodes can access to the outputs of both nodes. In such a network, the error caused by deflection in the SN can be corrected in the USN in only one step.

For example, if there are two packets A and B input to a SN as shown in FIG. 4, packet A, from input 010 to output 101, and packet B, from input 100 to output 100, they will collide at the second stage when they arrive at node 01 and make a request for output 0. Suppose packet B wins the contention and packet A is deflected to node 11 in the third stage. If packet A is moved to the companion node 11 in the corresponding USN and is switched to output 0, then it will reach node 01 at the next stage; the same node label when error occurred in the previous stage. At this point, the error caused by deflection has been corrected by the previous step and packet A can return to its normal path in the SN again. Intuitively, this works because any routing operation in the SN can be undone by a reverse routing operation in the USN, and vice versa.

The above procedure can be formulated more rigorously as follows. If a packet is in state $(r_1 \ldots r_k, x_1 \ldots x_{n-1})$, the packet should be sent out on link $<r_k, x_1>$. Suppose it is deflected to link $<r_k, x_1>$ instead and reaches node $(x_2 \ldots x_{n-1} r_k)$ in the next stage. If the bit $x_1$ is attached to the routing tag instead of removing the bit $r_k$, then the state of the packet will be $(r_1 \ldots r_k x_1, x_2 \ldots x_{n-1} r_k)$ in the next stage. Then the packet is moved to the companion node in the USN to correct the error. If the packet is successfully routed this time, it will be sent out on link $<x_1, r_k>$ and return to the previous state $(r_1 \ldots r_k, x_1 \ldots x_{n-1})$. Thus, the error has been corrected and the packet can return to the SN to complete its remaining journey.

Similarly, the error occurred in the USN can also be fixed in one step in the SN. The state diagrams of these error-correcting procedure are illustrated in FIGS. 5a and 5b. The diagrams assume packets are deflected to links within their original networks. In general, a packet in the SN may be deflected to the USN and vice versa, because of routing interference from other packets whose errors are being corrected. The next section shows that this can be taken into consideration.

Error-Correcting Routing Algorithm

Figure 6:
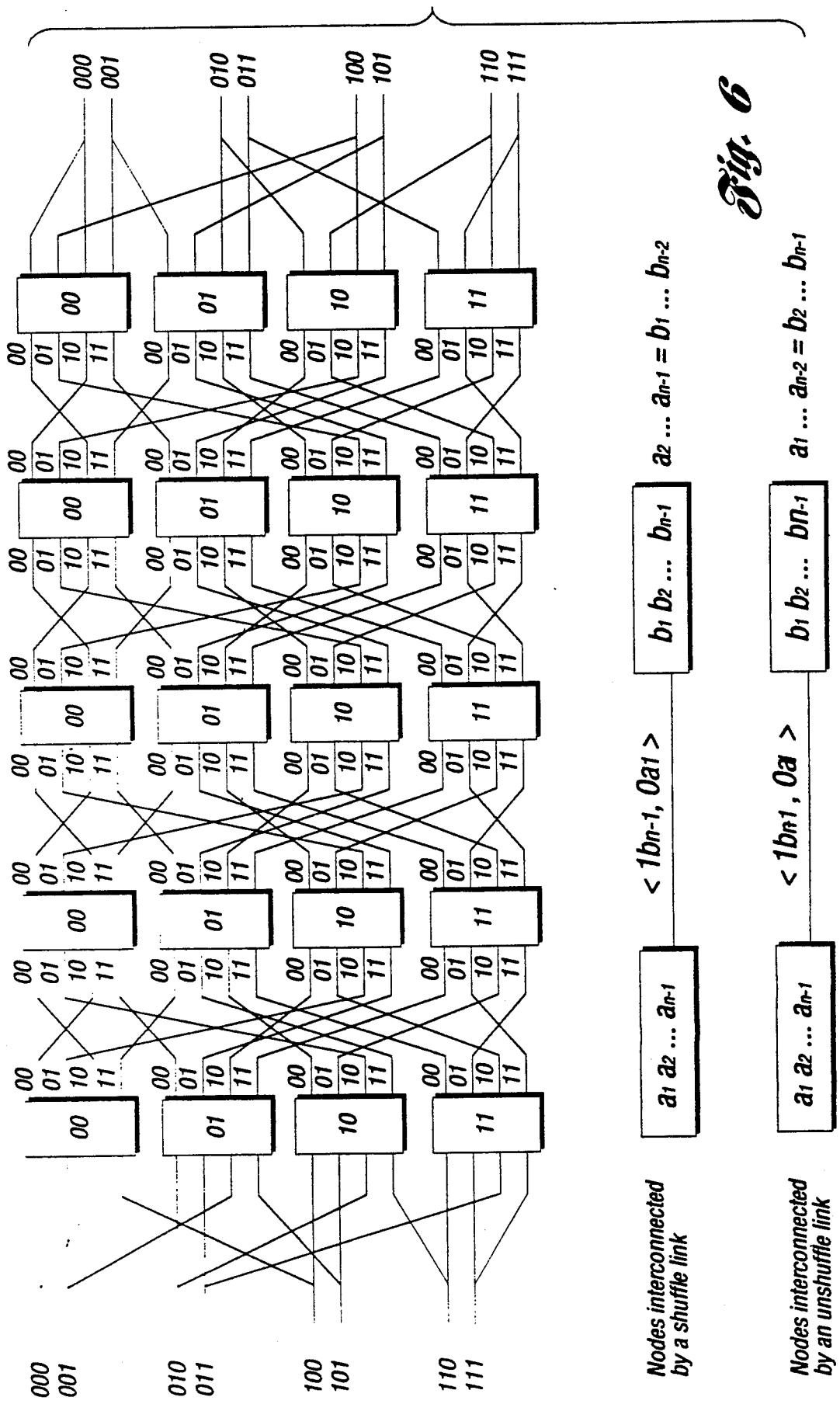
FIG. 6 is a view illustrating an 8×8 dual-shuffle exchange network.

A dual shuffle-exchange network built from 4×4 switch elements can be constructed as shown in FIG. 6, where the SN and USN are combined to form the DSN using a new labeling scheme. A packet can be routed either through the links of the SN or the links of the USN inside the DSN. This is elaborated upon in the next subsection. It can be assumed that a packet will be routed through the SN links, with any excursion to the USN links being for error correction only.

As shown in FIG. 6, the four inputs (outputs) of a switch node are labeled by 00,01,10,11 from top to bottom, where outputs 00 and 01 are connected to the next stage according to an unshuffling pattern, and outputs 10 and 11 are connected to the next stage according to a shuffling pattern. Specifically, a link with label $<1a, 0b>$ is an unshuffle link and a link with label $<0a, 1b>$ is a shuffle link. Two nodes $(a_1 \ldots a_{n-1})$ and $(b_1 \ldots b_{n-1})$ are connected either by an unshuffle link $<0b_1, 1a_{n-1}>$ if $a_1 \ldots a_{n-2} = b_2 \ldots b_{n-1}$, or by a shuffle link $<1b_{n-1}, 0a_1>$ if $a_2 \ldots a_{n-1} = b_1 \ldots b_{n-2}$. The construction of the link label is such that the second part of it can be used as the error-correcting routing bits in case of deflection. This is elaborated upon hereinbelow.

Two-bit information is required to implement the self-routing algorithm in a DSN. The initial routing tag of a packet with destination $D = d_1 \ldots d_n$ can be either $0d_1 \ldots 0d_n$ or $1d_n \ldots 1d_1$. There are two possible regular state transitions for a packet in state $(c_1r_1 \ldots c_kr_k, x_1 \ldots x_{n-1})$; the packet will be sent out on an unshuffle link if $c_k = 0$, otherwise it will send out on a shuffle link. The corresponding state transitions are given by:

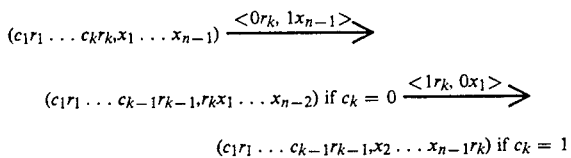

The error-correcting procedure can be demonstrated easily as follows. Suppose a packet in state $(c_1r_1 \ldots c_{k-1}r_{k-1}, 1r_k, x_1 \ldots x_{n-1})$ is deflected, it may go out on any one of the other three outputs $0r_k$, $\overline{0r_k}$, $1\overline{r_k}$. It is assumed, without loss of generality, that the packet is routed to output link $<0r_k, 1x_{n-1}>$, then it will arrive at the wrong node $(r_k k_1 \ldots s_{n-2})$ rather than the correct node $(x_2 \ldots s_{n-2} r_k)$ in the next stage. From the above state transition, the packet will return to its previous state if the error-correcting tag $1x_{n-1}$ is attached to the routing tag instead of removing $1r_k$. This point can be best illuminated by the following sequence of state transitions:

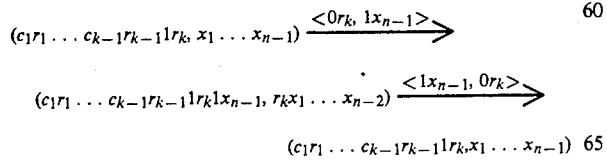

Thus, the routing direction is simply given by the following:

1. If output $c_kr_k$ is available and $k > 1$, remove the two least significant bits from the routing tag and send the packet to the next stage.
2. If output $c_kr_k$ is available and $k = 1$, output packets before next shuffle if $c = 1$, but output packets after next unshuffle if $c = 0$.
3. If output $c_kr_k$ is unavailable and $k < n$, choose any one of the other available outputs, attach the error-correcting tag of the output to the routing tag and send the packet to the next stage.
4. If output $c_kr_k$ is unavailable and $k = n$, reset the routing tag to its original value, either $0d_1 \ldots 0d_n$ or $1d_n \ldots 1d_1$. The prevents the length of the routing tag from growing in an unbounded fashion.

Figure 7:
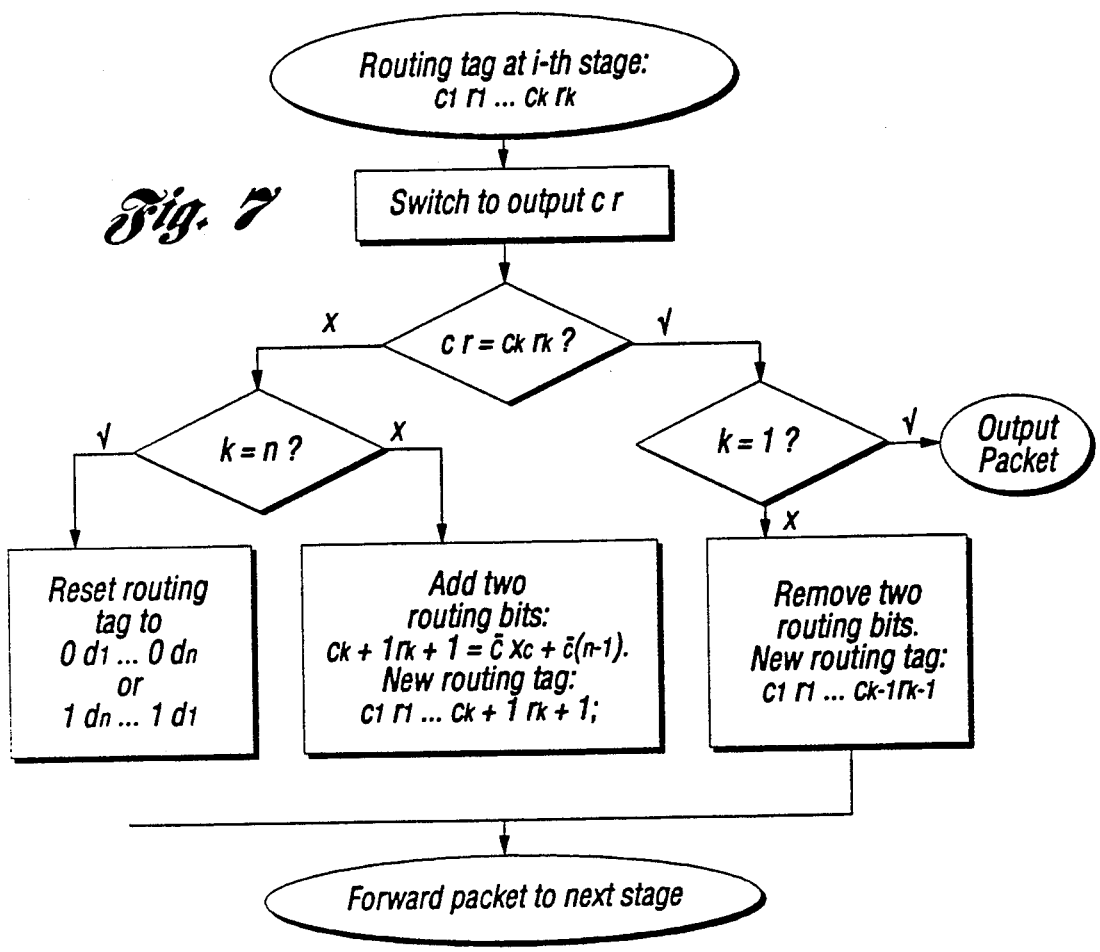
FIG. 7 is a block diagram flow chart illustrating the error-correcting routing algorithm of the present invention.
Figure 9:
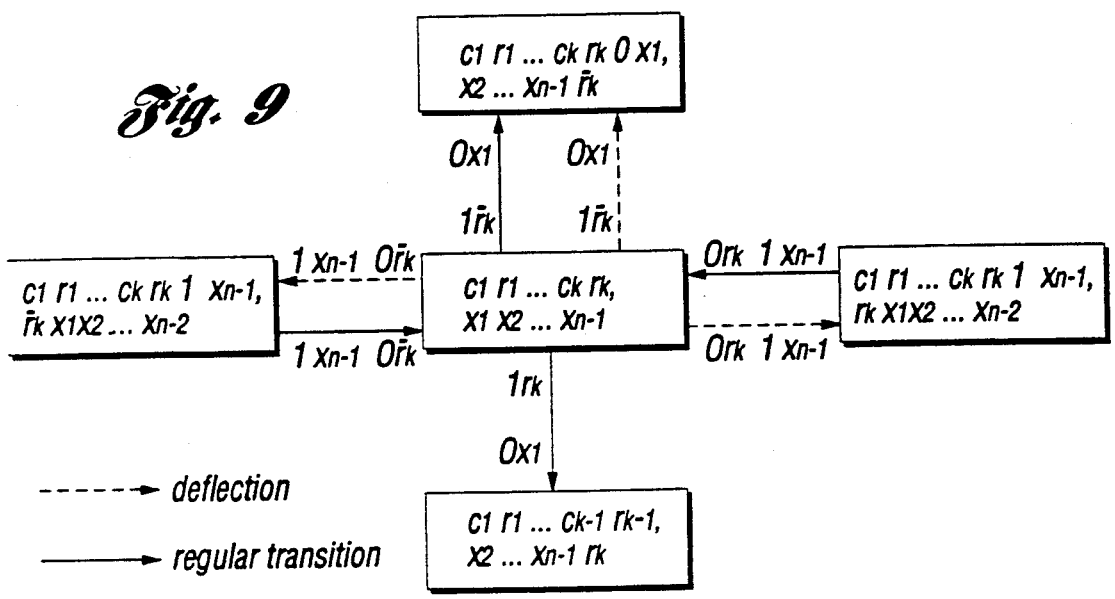
FIG. 9 is a finite-state-machine representation of the error-correcting routing algorithm, assuming $C_k=1$.
Figure 8:
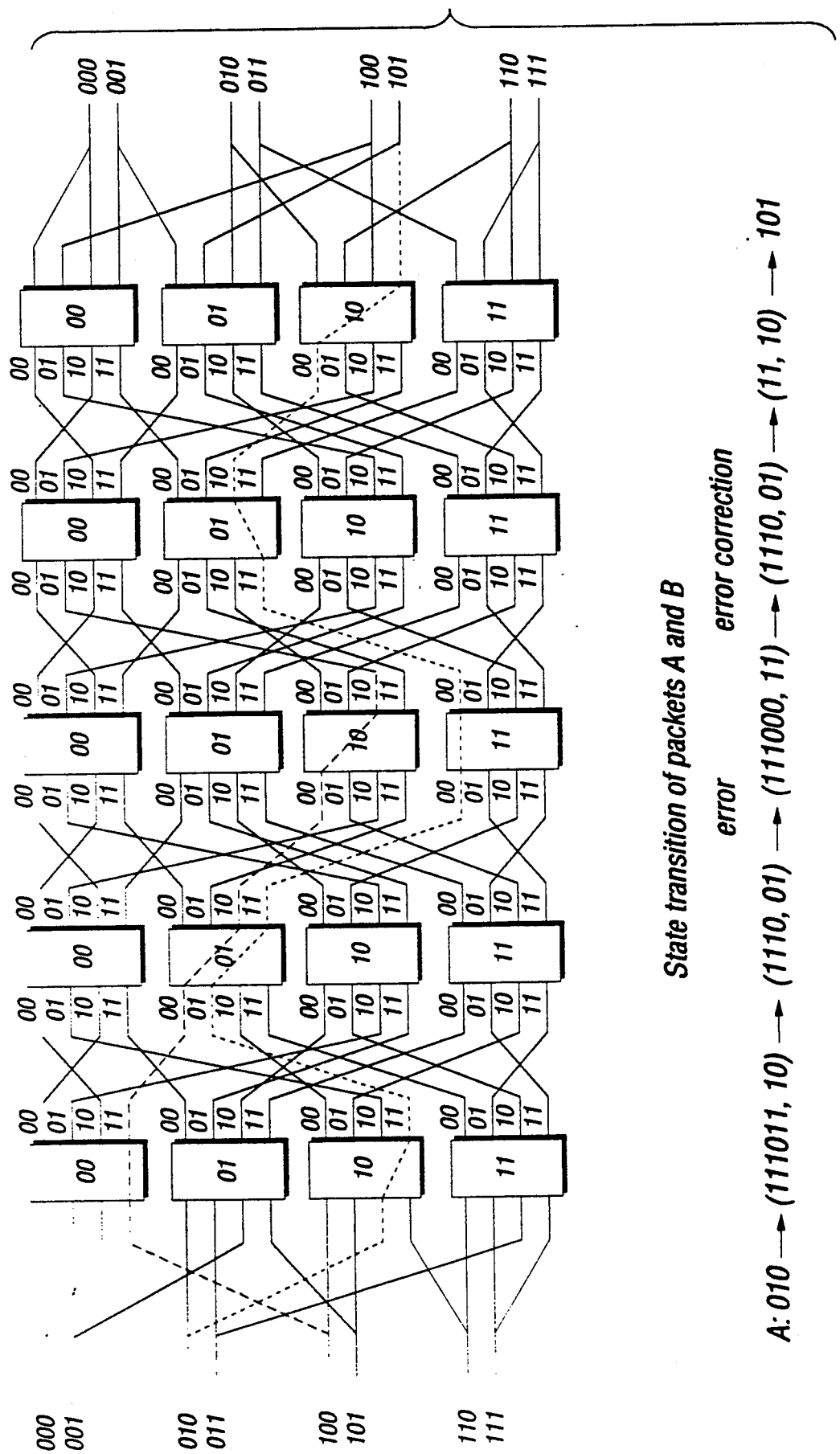
FIG. 8 is a schematic view illustrating an example of error-correcting routing in DSN.

FIG. 7 illustrates the complete error-correcting algorithm flow chart. For any node with label $(x_1 \ldots s_{n-1})$, the error correcting tag of outputs 00 and 01 is $1x_{n-1}$, and the error-correcting tag of outputs 10 and 11 is $0x_1$. In other words, the second component $cx$ in the link label $<cr, cx>$ is the error-correcting tag of the output specified by the first component $cr$, and $x = x_{c+c(n-1)}$, where $x_{c+c(n-1)}$ is taken from the node label $(x_1 \ldots x_{n-1})$. Therefore, a packet deflected to link $<cr, cx>$ will return to its previous state via link $<cx, cr>$ in the next stage. This point is illustrated in FIG. 8 by the same example given in FIG. 4. The complete routing algorithm can also be represented by a finite-state machine as shown in FIG. 9, where the state transitions when deflection occurred are given by:

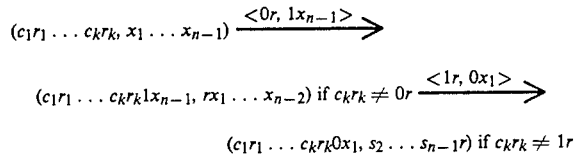

From this finite-state machine representation it is easy to see that the algorithm is recursive and capable of correcting consecutive errors.

Implementation Issues

The above basic concept can be employed in several network design alternatives. FIG. 10(a) illustrates conceptually an alternative in which the DSN is configured to have dimensions $N \times N$. Both the SN and USN in the DSN are used for routing packets. An incoming packet is routed either to an SN input or an USN input, and accordingly, its routing tag is set to either $1d_n \ldots 1d_1$ or $0d_n \ldots 0d_1$. In the first case, the packet's primary route is in the SN, and in the second case, the primary route is in the USN. Any excursion to the companion network is for error-correction purposes only. The primary network is also used for error correction in addition to ordinary routing. Error correction in the primary network may be needed when consecutive errors are made. This is because, regardless of the primary route, a packet can be deflected to either networks, and deflections to the SN must be corrected in the USN, and vice versa.

FIG. 10(b) shows an alternative which uses the DSN as a $2N \times 2N$ switch. Here, the outputs $d_1d_2 \ldots d_n$ of the SN and USN belong to two different logical addresses, $1d_1d_2 \ldots d_n$ and $0d_1d_2 \ldots d_n$, respectively. An incoming packet with destination $1d_n \ldots d_1$ will be assigned the routing tag $1d_n 1d_{n-1} \ldots 1d_1$, and a packet with destination $0d_n \ldots d_1$ will be assigned the routing tag $0d_1 0d_2$.

..0d$_n$. This set-up has the advantage that switch size is double that of FIG. 10(a).

For explanation purposes, however, the design in FIG. 10(a) is discussed for the rest of this subsection in combination with FIG. 4. The first shuffle of the links in the SN of FIG. 4 is unnecessary, since the input port of a packet is irrelevant as far as routing is concerned. The same routing tag assigned to packets in the SN can be still be used. The unshuffling pattern at the last stage of the USN can also be eliminated. However, in this case, the routing tag for a packet in the USN must be set to 0d$_n$0d$_1$0d$_2$...d$_{n-1}$. That is, a 2-bit cyclic right shift is performed on the original routing tag so that the two least significant bits 0d$_n$ are used at the last stage of the new USN. The main advantage of the above modification is that the bypass mechanisms within the SN and USN can both be implemented at the outputs of switch nodes; otherwise, the bypass mechanism of the USN must be implemented at the inputs of the next stage (i.e., after unshuffling the output links of the present stage).

With the above modifications, a block diagram of a switch node is shown in FIG. 11(a). FIG. 11(b) depicts the connection of bypass lines across two nodes of successive stages. The bypass lines are needed only for stages n and above. There are several schemes that could be used to arbitrate packet contention for the same output ports of the 4×4 switch. For instance, one could give priority to packets that are closer to their destinations, or one could give priority to packets that are coming from the upper input links.

The postprocessors process packets according to the logic outlined in FIG. 7. A packet that has reached its destination will be moved to the bypass line and multiplexed with other packets that have reached the same destination in the previous stages. Although the multiplexers create physical queues internal to the network, the queuing performance of this switch and the underlying queuing discipline are similar to that of an output-queued switch. The physical buffers for the output queue here are distributed across many switch nodes.

With a slight modification on the routing algorithm, the buffer size at each switch node can be decreased without penalizing the performance drastically. Specifically, when a packet reaches its destination at a bypass location with a full buffer, instead of dropping the packet, the postprocessor simply treats it as if it were a deflected packet and attaches two error-correcting routing bits to it. In this way, the packet will have the chance to reach another bypass location at a later stage. For simplicity, however, this modification will not be assumed in the analysis of the next section.

If the 4×4 deflection switch is implemented using a crossbar switch, a total of 16 crosspoints are needed. Such a switch is non-blocking. But using a nonblocking switch would not exploit the principle of error-correcting routing to the fullest extent. Since the penalty of deflection is small, it is not necessary to implement "perfect switching" at the microscopic level. A 4×4 banyan network is good enough.

Figure 12A:
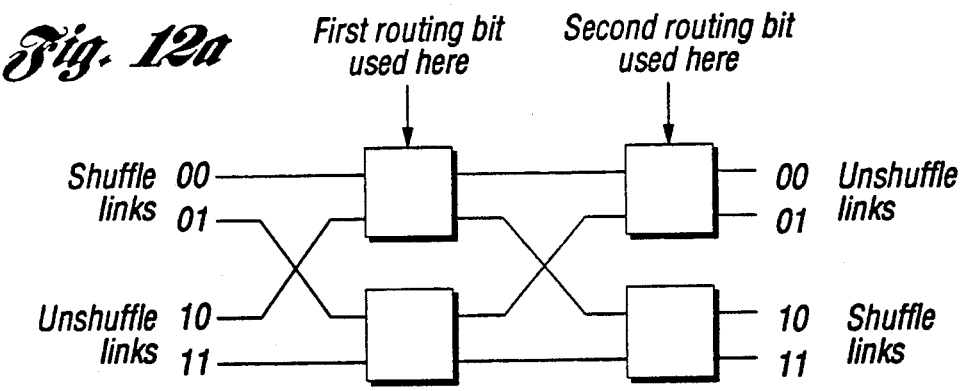
FIG. 12a is a view illustrating a 4×4 banyan deflection switch.
Figure 12B:
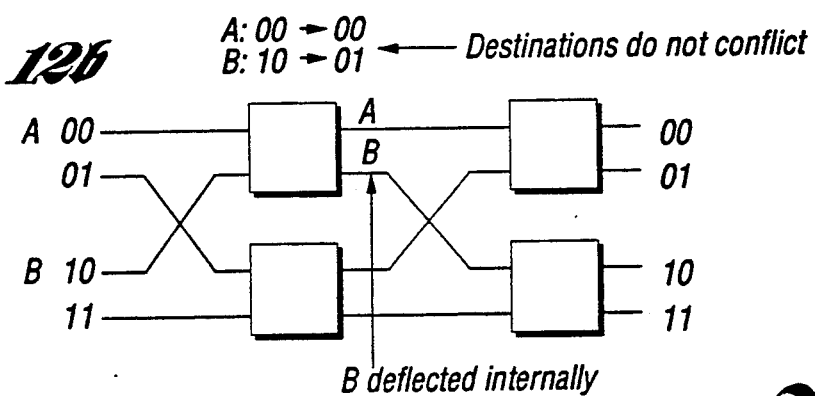
FIG. 12b is a view illustrating an example of internal conflict when there is no output conflict.

As shown in FIG. 12(a), only 4 crosspoints are needed. There are two stages, and one of the two routing bits is used at each stage. A packet deflected in a 2×2 switch is marked. To reduce deflection probability at the second stage, priorities are given to unmarked packets if contention occurs. While a packet may be deflected because of "internal conflict" even when there is no contending packet for the same "external output" (see FIG. 12(b)), the probability of this type of deflection is small.

For example, where four inputs are loaded, assume that each input packet is equally likely to be destined for any of the four outputs and that under contention the winning (undeflected) packet will be chosen at random. The deflection probability with a nonblocking switch element is (input load - output load)/input load=$1-(1-0.75^4) \approx 0.3164$; the deflection probability with a banyan network is 1−Pr [not deflected at 1st stage]×Pr [not deflected at 2nd stage]=$1-0.75(1-0.75 \times 0.25) \approx 0.3906$. The additional deflection probability attributed to the blocking structure of the banyan network is only $0.3906-0.3164=0.0742$. Additionally, deflections can always be corrected later without severe penalties in the DSN. Therefore, it is probably better to use banyan switch elements rather than nonblocking switch elements to build the DSN. The nonblocking and banyan designs are compared in more detail in the next section.

Analysis and Simulation

This section shows that the complexity of the DSN is of order NlogN using an approximate analysis. Simulation results verifying the validity of the analysis and the correctness of the routing algorithms are then presented. Finally, the complexities of several implementation alternatives are compared.

Analysis: Complexity of DSN

Since routing requires at least n=logN stages, clearly the lower bound on the complexity of the DSN is NlogN. It is shown hereinbelow that NlogN is also an upper bound on the order of complexity for a given packet-loss probability requirement $P_{loss}$. As a simplifying approximation, it is assumed that the input packets to a switch node are uncorrelated with each other and that they are equally likely to be destined for any of the four outputs. It is further assumed that the 4×4 switch elements are internally nonblocking.

Let $p_t$ be the load of an input at stage t, i.e., $p_t$ is the probability that there is an incoming packet on an input link. Let $\rho_t$ be the probability that a packet is successfully routed at stage t. $p_t$ and $\rho_t$ are related by:

$$p_t = \frac{1 - \left(1 - \frac{1}{4} p_t\right)^4}{\rho_t} \quad (1)$$

Figure 13:
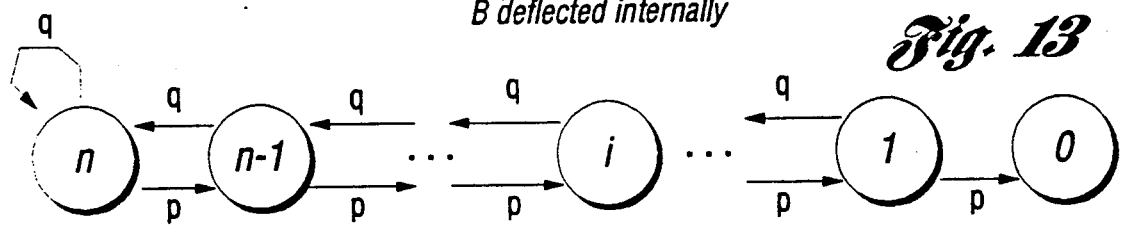
FIG. 13 is a view illustrating a Markov chain for bounding L analytically.

It is easy to show from the above that $$\frac{d\rho_t}{dp_t} \leq 0$$

for $0 \leq p_t \leq 1$. Since the load cannot increase as t increases (number of packets cannot increase), $p_t$ is a nonincreasing function of t. Therefore, $\rho_t \geq \rho_{t-1} \geq \ldots \geq \rho_1$. This agrees with intuition that the probability of success increases as more and more packets are removed from the network. To obtain an upper bound on L, the number of states required to meet a given $P_{loss}$, a worst-case analysis is performed in which $\rho_t$ is replaced by $\rho_1=\rho$. That is, the L required by the system is bounded above the by the L required in a corresponding "homogeneous" random walk depicted by the Markov chain in FIG. 13. The state of the Markov chain is the distance from destination, and $q=1-p$ is the deflection probability.

For analytical convenience, a version of the DSN similar to the one in FIG. 10(a) is adopted, but in which each of the N incoming packets is randomly routed to one of the 2N input ports of the SN and USN, with at most one packet assigned to the same input port. The input load on each input is $\rho_1 = 0.5$. This gives:

$$p = p_1 = \frac{1 - (1 - 0.5/4)^4}{0.5} \approx 0.828 \tag{2}$$

Let $g_i(k)$ be the conditional probability that a packet will reach its destination (or state 0) in k more steps given that its current state is i.

$$g_0(k) = \begin{cases} 1 & \text{if } k = 0 \\ 0 & \text{otherwise,} \end{cases} \tag{3}$$

$$g_i(k) = p\, g_{i-1}(k-1) + q\, g_{i+1}(k-1); 0 < i < n, \tag{4}$$

$$g_n(k) = p\, g_{n-1}(k-1) + q\, g_n(k-1). \tag{5}$$

The z-transform $G_i(z) = \sum_{k=0}^{\infty} g_i(k)\, z^k$ is given by (6)

$$G_0(z) = 1, \tag{7}$$

$$G_i(z) = p\, z\, G_{i-1}(z) + q\, z\, G_{i+1}(z); 0 < i < n, \tag{8}$$

$$G_n(z) = p\, z\, G_{n-1}(z) + q\, z\, G_n(z). \tag{9}$$

Equation (8) is a linear difference equation in terms of i; eqns. (7) and (9) are the boundary conditions. The general technique for solving the difference equation (8) is to substitute $G_i(z) = S^i(z)$. This gives $$S^2(z) - \frac{1}{qz} S(z) + \frac{p}{q} = 0. \tag{10}$$

The roots of the quadratic equation are:

$$S_1(z), S_2(z) = \frac{1}{2qz}(1 \pm \sqrt{1 - 4pqz^2}) \tag{11}$$

The general solution of $G_i(z)$ is $$G_i(z) = C_1(z) S_1^i(z) + C_2(z) S_2^i(z). \tag{12}$$

The constants, $C_1(z)$ and $C_2(z)$, can be found by matching the boundary conditions at $i=0$ and $i=n$ using eqns. (7) and (9). This yields $$G_n(z) = \frac{p\, z\, [S_2^{n-1}(z) S_1^n(z) - S_1^{n-1}(z) S_2^n(z)]}{(1 - qz)[S_1^n(z) - S_2^n(z)] - p\, z\, [S_1^{n-1}(z) - S_2^{n-1}(n)]} \tag{13}$$

A Chernoff bound can be obtained on $P_{loss}$ as follows:

$$P_{loss} \leq \sum_{k=L+1}^{\infty} g_n(k) \tag{14}$$

$$\leq \sum_{k=L+1}^{\infty} g_n(k) z^{k-(L+1)}; \text{ for some real } z \geq 1$$

$$\leq z^{-(L+1)} \sum_{k=0}^{\infty} g_n(k) z^k$$

$$= z^{-(L+1)} G_n(z).$$

Thus, $G_n(z)$ is of interest for real $z \geq 1$. It is clear from inequality (14) that to obtain a tight bound, $z^{-(L+1)}$ must be sufficiently small, or z sufficiently large. It is determined a priori that z is chosen large enough that $S_1(\cdot)$ and $S_2(\cdot)$ are both complex. Then, it is more convenient to express them in the polar coordinates of the complex plane:

$$S_1(\theta), S_2(\theta) = \sqrt{p/q}\, e^{\pm j\theta}, \tag{15}$$

where $$j = \sqrt{-1} \text{ and } \theta = \cos^{-1}\frac{1}{2z\sqrt{pq}}. \tag{16}$$

After some manipulation, there is obtained:

$$G_n(\theta) = \frac{(p/q)^{n/2} \sin\theta}{\sin(n+1)\theta - \sqrt{q/p}\,\sin n\theta} \tag{17}$$

On examination, substituting $\theta = 0$ appears to give a reasonably tight Chernoff bound. Doing so yields:

$$G_n(\theta = 0) = \frac{(p/q)^{n/2}}{(n+1) - \sqrt{q/p}\, n} \tag{18}$$

$$\leq \frac{(p/q)^{n/2}}{(n+1)(1 - \sqrt{q/p})}.$$

Now, $\theta = 0$ implies $$z = \frac{1}{2\sqrt{pq}}. \tag{19}$$

Substituting the above $G_n(\cdot)$ and z into inequality (14) and taking logarithms on both sides yields an upper bound for L:

$$L \leq 2.793n - 3.554\, \ln(n+1) + 3.554 \ln P_{loss}^{-1} + 1.162. \tag{20}$$

Since each stage consists of N/2 switch elements, the complexity of the DSN for a given $P_{loss}$ is therefore of order NlogN.

Simulation Results

Several alternative DSN designs have been simulated and their $P_{loss}$ statistics have been collected. In all the simulations presented herein, priorities are given to packets closest to their destinations when contention arises in a switch node.

Figure 14:
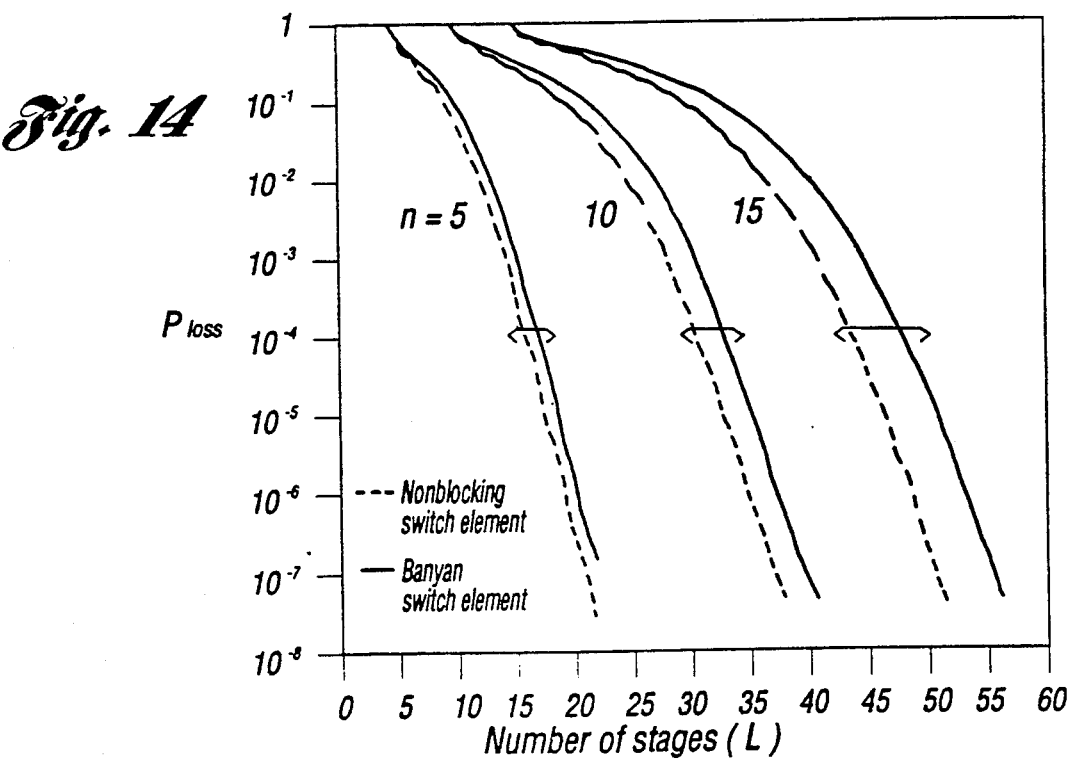
FIG. 14 is a graph of $P_{loss}$ versus L for various n; (dashed line: design using nonblocking 4×4 switch nodes; solid line: design using 4×4 banyan switch nodes)

FIG. 14 is a graph wherein $P_{loss}$ is plotted versus L for various values of n. These are the results based on the DSN design in FIG. 10(a). That is, the DSN is used as an N×N switch, and an incoming packet is randomly routed to one of the two alternative input ports of the SN and USN. This is slightly different from the assumption in the analysis, where the packet can be routed to any of the 2N input ports. This, however, should not give rise to drastically different performance results. The dashed-line curves correspond to the design with 4×4 nonblocking switch nodes (see previous section). The solid-line curves assume 4×4 banyan switch elements instead (see FIG. 12). From the graph, the L needed for a fixed $P_{loss}$ in the second design is just slightly larger than that in the first design. Furthermore, for a given n, the difference in L is almost constant regardless of $P_{loss}$ (for $P_{loss} \leq 10^{-2}$).

Figure 15:
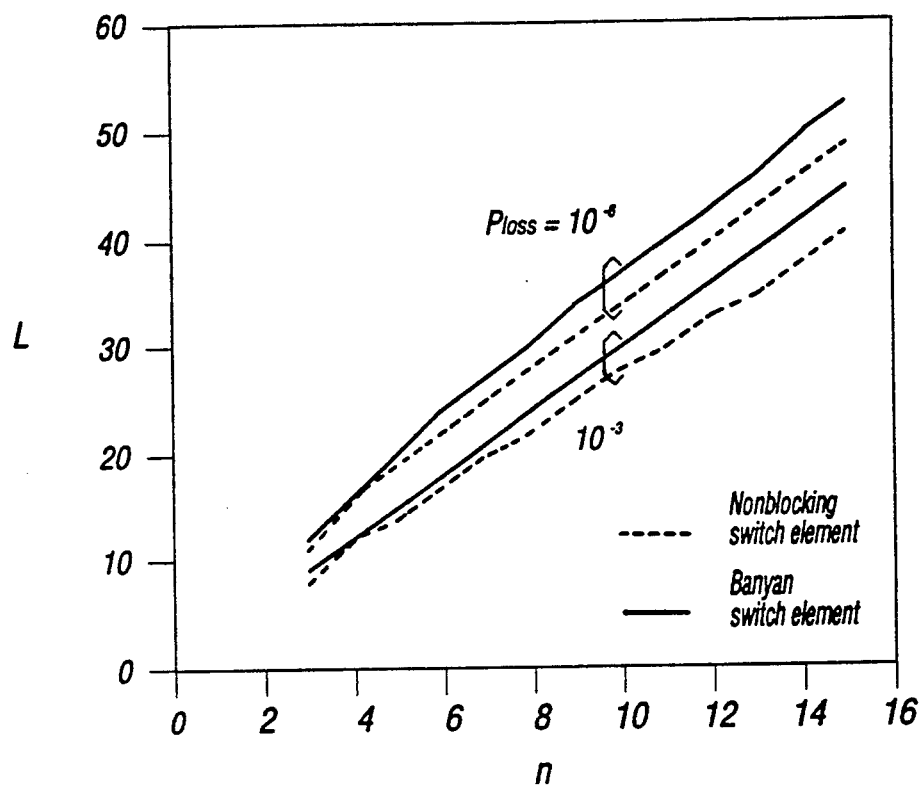
FIG. 15 is a graph of L versus n, fixing $P_{loss}$ at $10^{-3}$ and $10^{-6}$; (dashed line: design using nonblocking 4×4 switch nodes; solid line: design using 4×4 banyan switch nodes)

To examine the same results from a different angle, FIG. 15 plots L versus n for $P_{loss}=10^{-3}$ and $P_{loss}=10^{-6}$. As expected, and in agreement to the analysis, L is linear in n. The difference between the two designs is in the gradients of the lines. For the nonblocking-switch-element design, the gradient is about 3.0, whereas for the banyan-switch-element design, the gradient is about 3.2, a small difference. On the other hand, the minimal-complexity non-blocking 4×4 switch is the Benes network, which requires six 2×2 switch elements and a more complex algorithm for setting them. Thus, roughly, the banyan-switch-element architecture is less complex than the non-blocking-switch element architecture by a factor of at least $$\frac{3.2}{3.0} \times \frac{4}{6} = 0.71.$$

Based on the banyan switch nodes, the designs of FIG. 10(a) and FIG. 10(b) are compared. To construct an N×N DSN using the second design, an $$\frac{N}{2} \times \frac{N}{2}$$

SN and an $$\frac{N}{2} \times \frac{N}{2}$$

Figure 16:
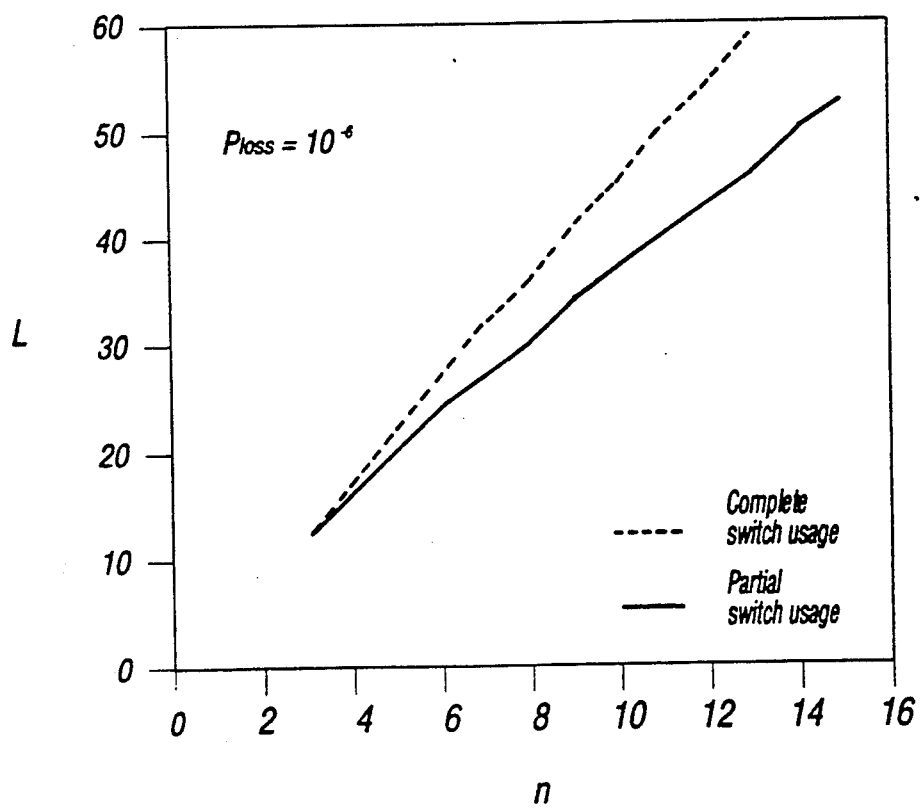
FIG. 16 is a graph of L versus n, fixing $P_{loss}$ at $10^{-6}$ assuming 4×4 banyan switch nodes; (dashed line: using N/2×N/2 SN and USN to realize N×N DSN; solid line: using N×N SN and USN to realize N×N DSN)

USN are used. With this strategy and under full load, all input ports have one incoming packet. Therefore, it is expected that a larger L is needed to meet a given $P_{loss}$. FIG. 16 is a graph wherein L is plotted versus n for $P_{loss}=10^{-6}$. The solid line corresponds to the design in FIG. 10(a) and the dashed line corresponds to the design in FIG. 10(b). Again, the gradients of the linear curves are the difference between the two designs. From the complexity viewpoint, as long as the L required in the second design is less than twice that in the first design, then it is worth using the second design. This is because the "width" of the second design is half that of the first design. From the graph, this is the case.

Deadlock Prevention in DSN

Deadlocks could occur in routing when a group of packets contend with each other in a periodic fashion and they take turns winning the contention. This may give rise to the situations in which their distances to destinations oscillate and fail to approach zero. As a result, no matter how large L is, $P_{loss}$ cannot be made arbitrarily small.

A deadlock example involving two packets is shown in FIG. 17. In the 4×4 DSN, the source and destination addresses of packet A are both 00, the source and destination addresses of packet B are both 01. According to the routing algorithm, both the packets are destined for output 00 at the first stage. If a policy is adopted favoring packets coming from upper input ports, then A wins the contention and B is deflected. In this example, B is deflected to output 01. Two error-correction routing bits, 00, are then attached to the routing tag of B. The two packets arrive at the same node again at the next stage, both wanting to access output 00 of the next stage. But B wins the contention this time because it is located at the upper input port. Meanwhile, A, will be deflected to output 01, and will be given two error-correction routing bits, 00. The states of A and B after this stage are the same as their original states in the beginning. In this way, the contention pattern repeats itself indefinitely, leading to a deadlock. More generally, deadlocks can involve more than two packets and can be quite subtle. Two simple ways to prevent deadlocks will now be discussed hereinbelow.

Random Routing

An obvious way to avoid deadlock is to randomize the contention arbitration process in the switch nodes. When more than one packet wants to access the same output, the winner will be drawn randomly among the packets. With probability one there will not be a deadlock, since the states of the packets cannot repeat themselves indefinitely. The approximate analysis of the previous section is actually consistent with this policy.

Step-Up Priority Routing

The simulations discussed in the simulation results section assume a priority scheme in which packets closest to their destinations are favored under contention. Deadlocks will not occur with this policy either. For example, suppose that a group of packets are involved in a deadlock. The distance of a packet that has the smallest distance to destination will be decreased by one after each stage. Otherwise, it is losing contention to another packet with the same distance, and this other packet will be concentrated upon instead. Eventually, a packet will break free and reach distance 0 (i.e. its destination). Thus, the deadlock could not have occurred.

More generally, priorities may be based on other criteria than closest distance, as long as they fall under the following scheme. Let p(A) denote the priority of packet A. The priorities may be described by a partial order $\geq$, whereby $p(A) \geq p(B)$ means packet A has a priority higher or equal to that of packet B. In the same manner, $p(A) > p(B)$ means the priority of A is strictly higher than that of B. If each time a packet is successfully routed, its priority is raised (one or more steps higher), then the policy is deadlock-free. The proof is essentially the same as in the previous paragraph, except that distance is replaced by whatever new criteria is assumed. Favoring packets with the longest distance does not fall under the above scheme and therefore may not be deadlock-free.

A Class of Random-Walk Models Realizable With DSN

So far, the random-walk model previously focused upon is the one shown in FIG. 2(b). A rich class of random-walk models can actually be realized with the DSN as discussed hereinbelow.

State n in FIG. 2(b) is different from other states because error in this state does not increment the distance further; the routing tag is simply reset to the original routing tag. Suppose that this state is treated no differently than other states. The corresponding random-walk model is shown in FIG. 18(a), in which there is no reflecting barrier. The advantage of removing the boundary is that the number of bypass locations in the DSN can be decreased. With the new random walk, regardless of the state of a packet, each deflection means the packet will need two more steps to reach its destination. In other words, a packet that experiences a total of k deflections will exit at stage n+2k of the DSN. Therefore, only stages n+2k, k=0,1,2..., need to have bypass mechanisms installed.

The disadvantage of the above scheme is that the length of the routing tag may in principle grow in an unbounded fashion. The random walk in FIG. 18(b) solves this problem while retaining the same advantages of reduced bypass locations. This random walk can be easily realized; the routing tag is bounded to at most $2(n+1)$ bits. In the new scheme, the error-correcting algorithm remains the same for packets in state $i, i<n$. However, if an error is made in state n, the routing tag is reset to the original routing tag plus two dummy error-correction bits (i.e., $0d_1 0d_2 \ldots 0d_n s_1 x_2$ or $1d_n 1d_{n-1} \ldots 1d_1 x_1 x_2$, where $x_1 x_2$ are the dummy routing bits). This moves the packet to state $n+1$. In state $n+1$, routing will be considered successful regardless of the outcome and the two dummy routing bits removed. Consequently, a packet in state $n+1$ will move to state n in one step with probability 1. Thus, there is a boundary in the random walk that reflects the walk one step to the right. As in the no-boundary case, it is not difficult to see that the number of steps required to reach state 0 is $n+2k$.

The above is just one among a class of random walks realizable with the DSN. In general, the bypass locations can be further limited to stages $n+2j$ k, $k=0,1,2,\ldots$ (for some fixed integer j). This is achieved by a random walk in which the penalty of deflection is $2j-1, j=1,2,\ldots$, steps backward. For illustration, an example with $j=2$ is shown in FIG. 18(c). The bypass locations for the corresponding DSN are at $n+4k$, $k=0,1,2,\ldots$, since each left transition means four extra steps will be required to reach state 0.

The modification on the routing algorithm when the packet is in state $i, i<n-2$ is now described. Imagine that deflections always happen in pairs in the DSN, so that each time the packet is deflected, it will be deflected again the next time. Therefore, a total of four additional steps will be needed, two for the deflections and two for the corrections. The above situation can be "forced" by introducing an additional one-bit field in the routing tag called deflecting balance. Ordinarily, the value of this field is 0. When deflection occurs, two routing bits will be added according to the original routing algorithm, and the deflection-balance field will be set to 1. At the next stage, regardless of the routing result, the packet will be considered as having been deflected because its deflection-balance field is 1. Thus, two more routing bits will be added, again according to the original routing algorithm, and the deflection-balance bit reset to 0. In this way, deflections are guaranteed to occur in pairs.

To complete the modification above, the deflections in states n, $n-1$, and $n-2$ must be treated differently because the state transitions cross the boundary at state n. Specifically, when deflections occur in states $n-m$, $m=0,1,$ or 2, the routing tag will be reset to the original routing tag plus $2(3-m)$ dummy routing bits. As in FIG. 18(b), routing in states above n will be considered successful regardless of the outcome.

It is easy to generalize the above scheme to $j=3,4,\ldots$. The deflection-balance field will be used to record the number of additional deflections that must be forced subsequent to the first deflection. However, as j increases, the penalty associated with deflection also increases. A larger L will then be needed in order to keep a constant $P_{loss}$. Nevertheless, intuitively, as long as j is independent of n, the complexity of the DSN will still be of order NlogN, albeit the associated "constant" (i.e., the gradient of the L-versus-n curve) may be very large for large j.

Communication Network Applications

Although the above discussion focuses on switch applications, the method and system of the present invention can be applied to communications networks.

Figure 19A:
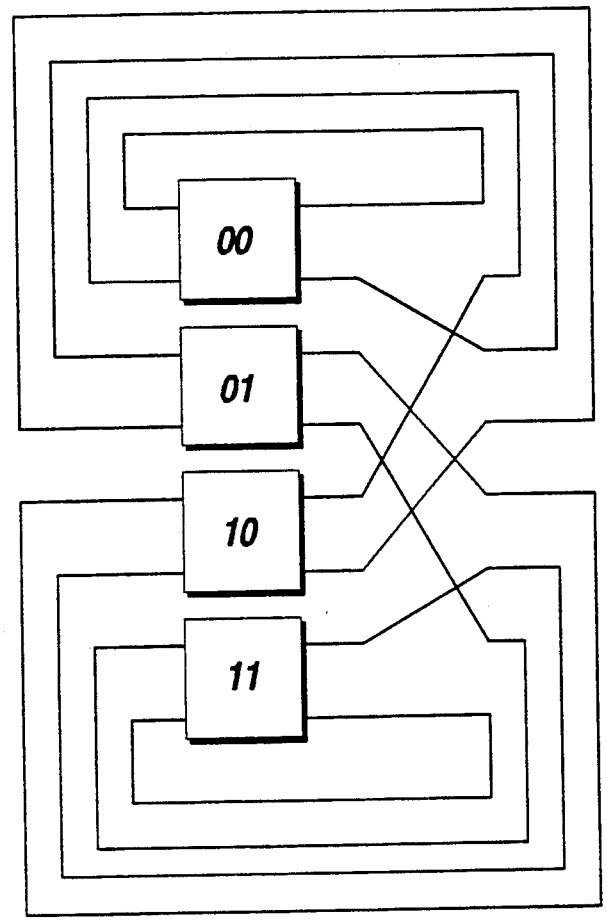
FIGS. 19a and 19b are views which illustrate a feedback network application of the dual-shuffle network, and how the component 4×4 nodes can be distributed across different network nodes.

Instead of connecting the outputs of the first stage of a shuffle network to the inputs of the next stage, the outputs are connecting to the inputs of the same stage. An example of the resulting "feedback" network is shown in FIG. 19a. Here, both the source and destination of each packet is a node. If each of the links show is bidirectional, then the network is basically a single-stage feedback dual-shuffle network in which each component node is actually of dimension $4 \times 4$. The same error-correcting algorithm can be used to route packets in this network, albeit with lower throughput.

Figure 19B:
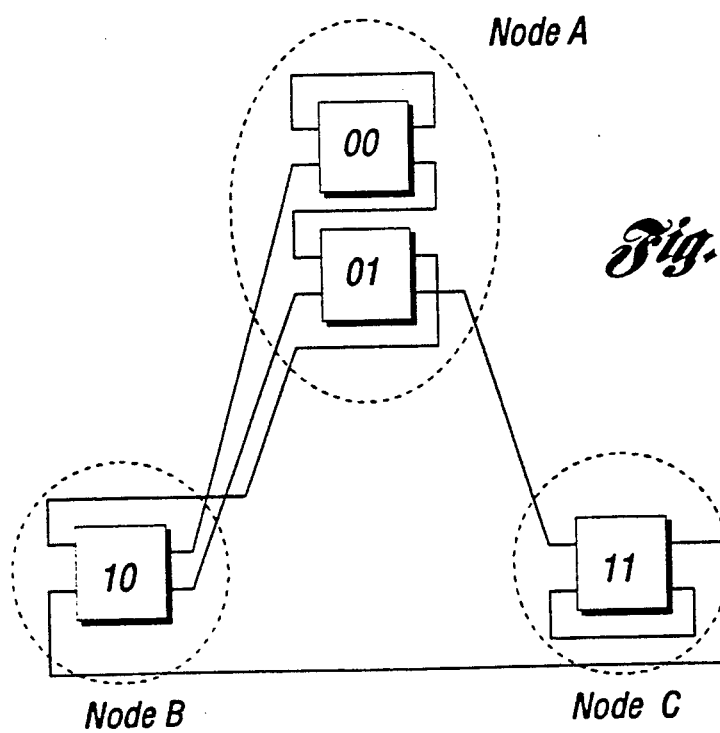

As shown in FIG. 19b, the component $4 \times 4$ nodes can be distributed across different communications-network nodes. The communications network nodes are separated geographically.

This basic network has been termed the "crossback network." The present invention, however, provides an adaptive header-address encoding scheme which is new. It provides a simple way to correct routing errors caused by deflection by manipulating only two bits of the packet header at each routing stage. Also, specific designs for the $4 \times 4$ switch nodes are provided herein. The $4 \times 4$ nodes need not be nonblocking for the network to be efficient.

The present network can also be used for cross-connect (circuit switching) applications in which header packets are used to establish circuits between nodes as discussed in greater detail hereinbelow.

The basic algorithm of the present invention can also be used to set up a virtual circuit in a packet network. Instead of solving packet contention at the cell (or packet) level, the concept is used to solve congestion problems at the virtual-circuit level. This also circumvents the packet-out-of-sequence problem inherent to this network when the concept is applied at the cell level. This problem is not inherent in the original dual-shuffle switch, as discussed above. It becomes inherent if the network is modified and adapted for network applications as described herein. The error-correcting routing algorithm is used to find the least-congested path during call setups. Deflection occurs when a certain output link (or link internal to a $4 \times 4$ switch) is congested. All packets of the same virtual circuit then follow the same route after the route has been established by a header packet containing the routing address. Buffers are needed at the $4 \times 4$ switch outputs to solve the contention problem at the cell level.

Finally, the network shown in FIG. 19a is a single-stage network. Multi-stage dual-shuffle networks can also be mapped into communication networks.

Circuit Switching Using DSN

Instead of using the DSN as a packet switch, one can also operate it as a circuit switch. In circuit switching, only one input is allowed to access an output at any given time. The multiplexer at a bypass location is then replaced by a single line together with a mechanism to indicate whether the corresponding output is busy. To establish a new circuit, a probe signal containing the destination address is launched into the switch. It goes through the same routing process as in the packet-switched DSN, and when it reaches its destination, the input will be informed whether the output is busy through a backward path running parallel to the forward path. If the output is idle, the circuit will then be accepted and it will use the path set by the probe signal. This appears to be a particular viable approach for optical switching in which the transmission bandwidth of the switched channel is typically so large that operation in the packet-switched mode is not efficient. That is, the bottleneck in such a system is the processing speed of the header information, and therefore it should be minimized. In the context of circuit switching, the probability of blocking can be made arbitrarily small with sufficiently large L.

CONCLUSION

There is described herein a dual shuffle-exchange network that makes use of the principle of error-correcting routing. Parallels have been drawn between the design philosophies of switching and transmission systems. Error-correcting routing in switching appears to be analogous to error-correcting coding in transmission.

Based on the error-correcting and self-routing algorithm, the dual shuffle-exchange network can achieve the NlogN Shannon's lower bound on switch complexity with arbitrarily small packet-loss probability. The only other known NlogN switch is the Benes network, which is not self-routing and requires $N(logN)^2$ time to set the switch nodes. In the context of self-routing switching, the present result is stronger than the NlogN (loglogN) complexity of the dilated-banyan network previously established.

The principle of error-correcting routing is a powerful switch design technique. Intuitively, the dual shuffle-exchange network can achieve the lower bound on switch complexity because the penalty of routing errors is minimal. To establish the principle of error-correcting on an even firmer basis, it will be interesting to investigate the possibility of other NlogN error-correcting networks and the characteristics common to this class of networks.

On the practical side, the combination of error-correcting routing with other switch design techniques, for example, dilation, is also of interest. In addition, because multicasting (point-to-multipoint) connections are required by many future broadband services, it may be desireable to use the dual shuffle-exchange network as a multicast switch, either by combining it with a copy network or by introducing multicast capability into the routing mechanism of the individual switch nodes.

While the best mode for carrying out the invention has been described in detail, those familiar with the art to which this invention relates will recognize various alternative designs and embodiments for practicing the invention as defined by the following claims.

What is claimed is:

1. A method of correcting a routing error caused by more than one packet at one switching node at one of a plurality of sequentially connected stages of a dual-shuffle exchange (DSN) network requesting connection to a same node in a next sequential routing stage of the DSN, the DSN comprising a shuffle-exchange network (SN) having a plurality of switching nodes and a complementary unshuffle-exchange network (USN) having a plurality of corresponding companion switching nodes, each packet including a routing tag for routing the packet through the DSN to a destination, the routing tag in each packet comprising a bit sequence of a plurality of bits which route the packet and which are deleted one-by-one as the packet and the remaining bits of its routing tag are routed from one stage to the next towards the packet's destination, the method comprising the steps of:

deflecting at least one of the packets requesting connection to the said same node in the SN (or USN) to a companion node to that said same node in the USN (or SN);

modifying the routing tag of the at least one deflected packet so that the modified routing tag includes error correcting information, the error correcting information including a plurality of additional bits which are added to the bit sequence of the remaining bits of the routing tag after deflection; and utilizing the error correcting information in the modified routing tag of the at least one deflected packet when it reaches the said companion node in the USN (or SN) to route the at least one deflected packet back to a node in one further next sequential stage of the SN (or USN), said node in the one further next sequential stage of the SN (or USN) being one which corresponds to the position of the node in the SN (or USN) from which deflection of the packet to the companion node in the USN (or SN) occurred and form which the at least one deflected packet can continue its route to said destination using its modified routing tag, the error correcting additional bits added to the routing tag after deflection being such that the bit sequence of the modified routing tag of the packet after routing to the n ode in the one further next sequential stage is the same as the bit sequence of the remaining bits of the routing tag of the packet when at the node from which deflection occurred.

2. The method of claim 1 wherein the switching nodes of the SN and USN include banyan deflection switches.

3. The method of claim 2 wherein the switching nodes of the SN and USN include at least one postprocessor for modifying the routing tag of the packet when deflection occurs.

4. The method of claim 1 wherein the DSN is configured as an N×N switch.

5. The method of claim 1 where the DSN is configured as a 2N×2N switch.

6. A system for correcting a routing error caused by more than one packet at one switching node at one of a plurality of sequentially connected stages of a dual-shuffle exchange (DSN) network requesting connection to a same node in a next sequential routing stage of the DSN, the DSN comprising a shuffle-exchange network (SN) having a plurality of switching nodes and a complementary unshuffle-exchange network (USN) having a plurality of corresponding companion switching nodes, each packet including a routing tag for routing the packet through the DSN to a destination, the routing tag in each packet comprising a bit sequence of a plurality of bits which route the packet and which are deleted one-by-one as the packet and the remaining bits of its routing tag are routed from one stage to the next towards the packet's destination, the system comprising:

means for deflecting at least one of the packets requesting connection to the said same node in the SN (or USN) to a companion node to that said same node in the USN (or SN);

means for modifying the routing tag of the at least one deflected packet so that the modified routing tag includes error correcting information, the error correcting information including a plurality of additional bits which are added to the bit sequence of the remaining bits of the routing tag after deflection; and means for utilizing the error correcting information in the modified routing tag of the at least one deflected packet when it reaches the said companion node in the USN (or SN) to route the at least one deflected packet back to a node in one further next sequential stage of the SN (or USN), said node in the one further next sequential stage of the SN (or USN) being one which corresponds to the position of the node in the SN (or USN) from which deflection of the packet to the companion node in the USN (or SN) occurred and from which the at least one deflected packet can continue its route to said destination using its modified routing tag, the bit sequence of the modified routing tag of the packet after routing to the node in the one further next sequential stage being the same as the bit sequence of the remaining bits of the routing tag of the packet when at the node from which deflection occurred.

7. The system of claim 6 wherein the switching nodes of the SN and USN include banyan deflection switches.

8. The system of claim 7 wherein the switching nodes of the SN and USN include at least one postprocessor for modifying the routing tag of the packet when deflection occurs.

9. The system of claim 6 wherein the DSN is configured as an N×N switch.

10. The system of claim 6 where the DSN is configured as 2N×2N switch.

11. A method for routing a probe signal having a routing tag through a plurality of switching nodes of sequentially connected stages of a dual-shuffle exchange (DSN) network to establish a new circuit, the DSN comprising a shuffle-exchange network (SN) having a plurality of switching nodes and a complementary unshuffle-exchange network (USN) having a plurality of corresponding companion switching nodes, the routing tag of the probe being used for routing the probe signal through the DSN to a destination, the routing tag of the probe signal comprising a bit sequence of a plurality of bits which route the probe signal and which are deleted one-by-one as the probe signal and the remaining bits of its routing tag are routed from one stage to the next towards its destination, at at least one of the switching nodes of one of the plurality of switching nodes of the SN (or USN) the probe signal being prevented from completing its path to the switching node in the next stage of the SN (or USN) to which its routing tag would direct it, the method comprising the steps of:

deflecting the probe signal to a companion node in the USN (or SN) of the switching node in the next stage of the SN (or USN) to which routing is prevented;

modifying the routing tag of the deflected probe signal so that the modified routing tag includes error correcting information, the error correcting information including a plurality of additional bits which are added to the bit sequence of the remaining bits of the routing tag of the probe signal after deflection; and utilizing the error correcting information in the modified routing tag of the deflected probe signal when it reaches the said companion node in the USN (or SN) to route the deflected probe signal back to a node in one further next sequential stage of the SN (or USN), said node in the one further next sequential stage of the SN (or USN) being one which corresponds to the position of the node in the SN (or USN) from which deflection of the probe signal to the companion node in the USN (or SN) occurred and from which the probe signal can continue its route to said destination using its modified routing tag, the bit sequence of the modified routing tag of the deflected probe signal after routing to the node in the one further next sequential stage being the same as the bit sequence of the remaining bits of the routing tag of the packet when at the node from which deflection occurred, wherein the path of the probe signal taken through the DSN defines a signal path through the DSN.

12. A system for routing a probe signal having a routing tag through a plurality of switching nodes at sequentially connected stages of a dual-shuffle exchange (DSN) network to establish a new circuit, the DSN comprising a shuffle-exchange network (SN) having a plurality of switching nodes and a complementary unshuffle-exchange network (USN) having a plurality of corresponding companion switching nodes, the routing tag of the probe being used for routing the probe signal through the DSN to a destination, the routing tag of the probe signal comprising a bit sequence of a plurality of bits which route the probe signal and which are deleted one-by-one as the probe signal and the remaining bits of its routing tag are routed from one stage to the next towards its destination, at at least one of the switching nodes of the SN (or USN) the probe signal being prevented from completing its path to the switching node in the next stage of the SN (or USN) to which its routing tag would direct it, the system comprising:

means for deflecting the probe signal to a companion node in the USN (or SN) of the switching node in the SN (or USN) to which routing is prevented;

means for modifying the routing tag of the deflected probe signal so that the modified routing tag includes error correcting information, the error correcting information including a plurality of additional bits which are added to the bit sequence of the remaining bits of the routing tag of the probe signal after deflection; and means for utilizing the error correcting information in the modified routing tag of the probe signal when it reaches the said companion node in the USN (or SN) to route the probe signal back to a node in one further next sequential stage of the SN (or USN), said node in the one further next sequential stage of the SN (or USN) being one which corresponds to the position of the node in the SN (or USN) from which deflection of the probe signal to the companion node in the USN (or SN) occurred and from which the probe signal can continue its route to said destination using its modified routing tag, the bit sequence of the modified routing tag of the probe signal after routing to the node in the one further next sequential stage being the same as the bit sequence of the remaining bits of the routing tag of the packet when at the node from which deflection occurred, wherein the path of the probe signal taken through the DSN defines a signal path through the DSN.

13. A method of correcting a routing error caused by more packets at one switching node at one of a plurality of sequentially connected communication network routing stages of a dual-shuffle exchange (DSN) communication network requesting connection to a same node in a next sequential routing stage of the DSN than what the capacity of that same node to accept packets is, at least one of the routing stages having feedback, the DSN comprising a shuffle-exchange network (SN) having a plurality of switching nodes and a complementary unshuffle-exchange network (USN) having a plurality of corresponding companion switching nodes, at least one packet including a routing tag for routing the packet through the DSN to a destination, the routing tag in each packet comprising a bit sequence of a plurality of bits which route the packet and which are deleted one-by-one as the packet and the remaining bits of its routing tag are routed from one stage to the next towards the packet's destination, the method comprising the steps of:

- deflecting at least one of the packets requesting connection to the said same node in the SN (or USN) to a companion node to that said same node in the USN (or SN);
- modifying the routing tag of the at least one deflected packet so that the modified routing tag includes error correcting information, the error correcting information including a plurality of additional bits which are added to the bit sequence of the remaining bits of the routing tag after deflection; and
- utilizing the error correcting information in the modified routing tag of the at least one deflected packet when it reaches the said companion node in the USN (or SN) to route the at least one deflected packet back to a node in one further next sequential stage of the SN (or USN), said node in the one further next sequential stage of the SN (or USN) being one which corresponds to the position of the node in the SN (or USN) from which deflection of the packet to the companion node in the USN (or SN) occurred and from which the at least one deflected packet can continue its route to said destination using its modified routing tag, the error correcting additional bits added to the routing tag after deflection being such that the bit sequence of the modified routing tag of the packet after routing to the node in the one further next sequential stage is the same as the bit sequence of the remaining bits of the routing tag of the packet when at the node from which deflection occurred.

14. A system for correcting a routing error caused by more packets at one switching node at one of a plurality of sequentially connected communication network routing stages of a dual-shuffle exchange (DSN) communication network requesting connection to a same node in a next sequential routing stage of the DSN than what the capacity of that same node to accept packets is, at least one of the routing stages having feedback, the DSN comprising a shuffle-exchange network (SN) having a plurality of switching nodes and a complementary unshuffle-exchange network (USN) having a plurality of corresponding companion switching nodes, at least one packet including a routing tag for routing the packet through the DSN to a destination, the routing tag in each packet comprising a bit sequence of a plurality of bits which route the packet and which are deleted one-by-one as the packet and the remaining bits of its routing tag are routed from one stage to the next towards the packet's destination, the system comprising:

- means for deflecting at least one of the packets requesting connection to the said same node in the SN (or USN) to a companion node to that said same node in the USN (or SN);
- means for modifying the routing tag of the at least one deflected packet so that the modified routing tag includes error correcting information, the error correcting information including a plurality of additional bits which are added to the bit sequence of the remaining bits of the routing tag after deflection; and
- means for utilizing the error correcting information in the modified routing tag of the at least one deflected packet when it reaches the said companion node in the USN (or SN) to route the at least one deflected packet back to a node in one further next sequential stage of the SN (or USN), said node in the one further next sequential stage of the SN (or USN) being one which corresponds to the position of the node in the SN (or USN) from which deflection of the packet to the companion node in the USN (or SN) occurred and from which the at least one deflected packet can continue its route to said destination using its modified routing tag, the error correcting additional bits added to the routing tag after deflection being such that the bit sequence of the modified routing tag of the packet after routing to the node in the one further next sequential stage is the same as the bit sequence of the remaining bits of the routing tag of the packet when at the node from which deflection occurred.

* * * * *